United States Patent
O'Hare et al.

(10) Patent No.: US 11,524,410 B2
(45) Date of Patent: Dec. 13, 2022

(54) ROBOTIC ALIGNMENT METHOD FOR WORKPIECE MEASURING SYSTEMS

(71) Applicant: Hexagon Metrology, Inc., North Kingstown, RI (US)

(72) Inventors: Jonathan J. O'Hare, East Greenwich, RI (US); Jonathan Dove, Woodstock, IL (US)

(73) Assignee: Hexagon Metrology, Inc., North Kingstown, RI (US)

( * ) Notice: Subject to any disclaimer, the term of this patent is extended or adjusted under 35 U.S.C. 154(b) by 370 days.

(21) Appl. No.: 16/900,348

(22) Filed: Jun. 12, 2020

(65) Prior Publication Data
US 2021/0387301 A1 Dec. 16, 2021

(51) Int. Cl.
| | |
|---|---|
| G01B 5/008 | (2006.01) |
| B25J 9/16 | (2006.01) |
| B25J 15/00 | (2006.01) |
| G01B 21/04 | (2006.01) |
| G01B 11/00 | (2006.01) |
| G05B 19/401 | (2006.01) |
| B25J 9/02 | (2006.01) |

(52) U.S. Cl.
CPC ........... *B25J 9/1697* (2013.01); *B25J 9/1692* (2013.01); *B25J 15/0028* (2013.01); *B25J 15/0057* (2013.01); *G01B 5/008* (2013.01); *G01B 11/005* (2013.01); *G01B 21/042* (2013.01); *G05B 19/401* (2013.01); *B25J 9/023* (2013.01); *G05B 2219/37193* (2013.01)

(58) Field of Classification Search
CPC .............................. G01B 5/008; G01B 11/005

USPC .......................................................... 33/503
See application file for complete search history.

(56) References Cited

U.S. PATENT DOCUMENTS

| | | | | |
|---|---|---|---|---|
| 3,869,799 A | * | 3/1975 | Neuer ...................... | B23Q 1/36 33/561 |
| 5,056,235 A | * | 10/1991 | Thomas ................. | G08C 23/04 340/870.11 |
| 5,150,529 A | * | 9/1992 | Collingwood ....... | G01B 21/047 340/13.24 |

(Continued)

FOREIGN PATENT DOCUMENTS

| | | |
|---|---|---|
| DE | 102015109960 B4 | 5/2017 |
| WO | 2017/163177 A2 | 9/2017 |

OTHER PUBLICATIONS

International Searching Authority: International Search Report and the Written Opinion of the International Searching Authority, Application No. PCT/US2021/035204, dated Aug. 5, 2021, 14 pages.

*Primary Examiner* — George B Bennett
(74) *Attorney, Agent, or Firm* — Nutter McClennen & Fish LLP

(57) ABSTRACT

Embodiments provide measurement systems having a coordinate measuring machine, a workpiece storage apparatus, and a robot for delivering workpieces from the workpiece storage apparatus to the coordinate measuring machine, and methods for orienting and operating such systems. Illustrative embodiments employ a reference geometry tool on the robotic arm, and kinematic locators on the coordinate measuring machine and/or on the workpiece storage apparatus to define a coordinate system common to the coordinate measuring machine, the workpiece storage apparatus, and the robot.

20 Claims, 18 Drawing Sheets

(56) References Cited

U.S. PATENT DOCUMENTS

| | | | |
|---|---|---|---|
| 5,724,745 A * | 3/1998 | Brenner | G05B 19/4207 33/561 |
| 6,352,354 B1 | 3/2002 | Boillot et al. | |
| 6,543,150 B2 * | 4/2003 | Matsumiya | G01B 7/012 33/DIG. 13 |
| 6,618,496 B1 | 9/2003 | Tassakos et al. | |
| 7,191,540 B1 * | 3/2007 | Brewer | G01B 5/20 33/503 |
| 7,665,219 B2 * | 2/2010 | Styles | G01B 5/012 33/503 |
| 8,607,466 B2 * | 12/2013 | Pettersson | G01B 21/045 33/503 |
| 8,756,973 B2 * | 6/2014 | Wallace | G01B 21/045 73/1.79 |
| 9,086,271 B2 | 7/2015 | Melikian et al. | |
| 9,250,053 B2 * | 2/2016 | Hirano | G01B 5/016 |
| 9,351,569 B1 | 5/2016 | Lucey et al. | |
| 9,352,466 B2 | 5/2016 | Liao et al. | |
| 9,731,419 B2 * | 8/2017 | Halsmer | B25J 9/1656 |
| 10,302,129 B2 * | 5/2019 | Poglitsch | F16C 32/0625 |
| 10,837,752 B2 * | 11/2020 | Mayinger | G01B 11/30 |
| 11,085,751 B2 * | 8/2021 | Kocic | G01B 5/0002 |
| 2001/0034948 A1 * | 11/2001 | Matsumiya | G01B 7/012 33/DIG. 13 |
| 2002/0068992 A1 | 6/2002 | Hine et al. | |
| 2011/0046782 A1 | 2/2011 | Fixell | |
| 2015/0241203 A1 * | 8/2015 | Jordil | G01B 5/0004 356/4.01 |
| 2016/0349034 A1 | 12/2016 | Cobb | |
| 2020/0078871 A1 | 3/2020 | O'Hare et al. | |
| 2021/0039259 A1 * | 2/2021 | Duprez | G01B 21/042 |
| 2022/0048198 A1 * | 2/2022 | Jonas | B25J 9/06 |

* cited by examiner

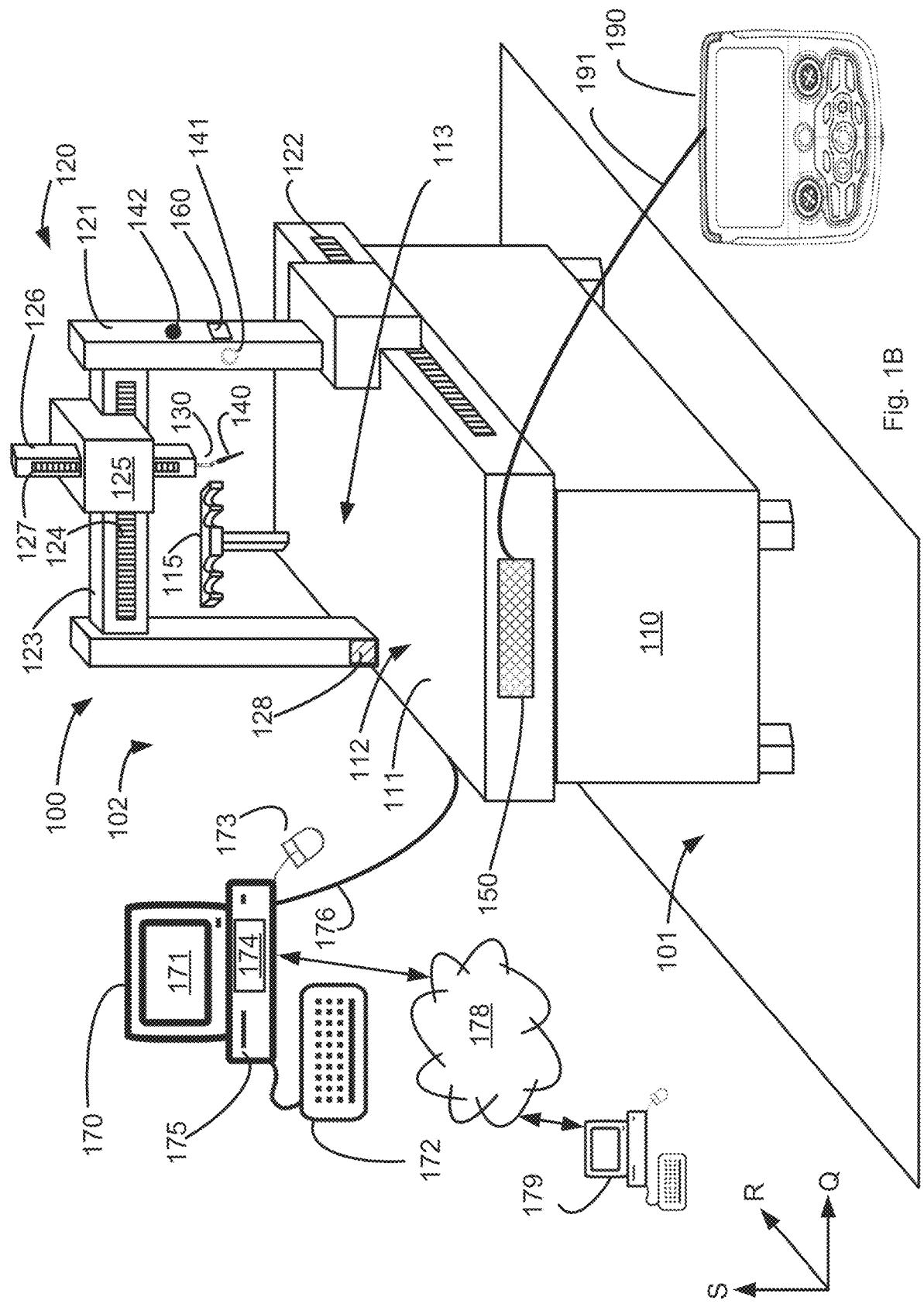

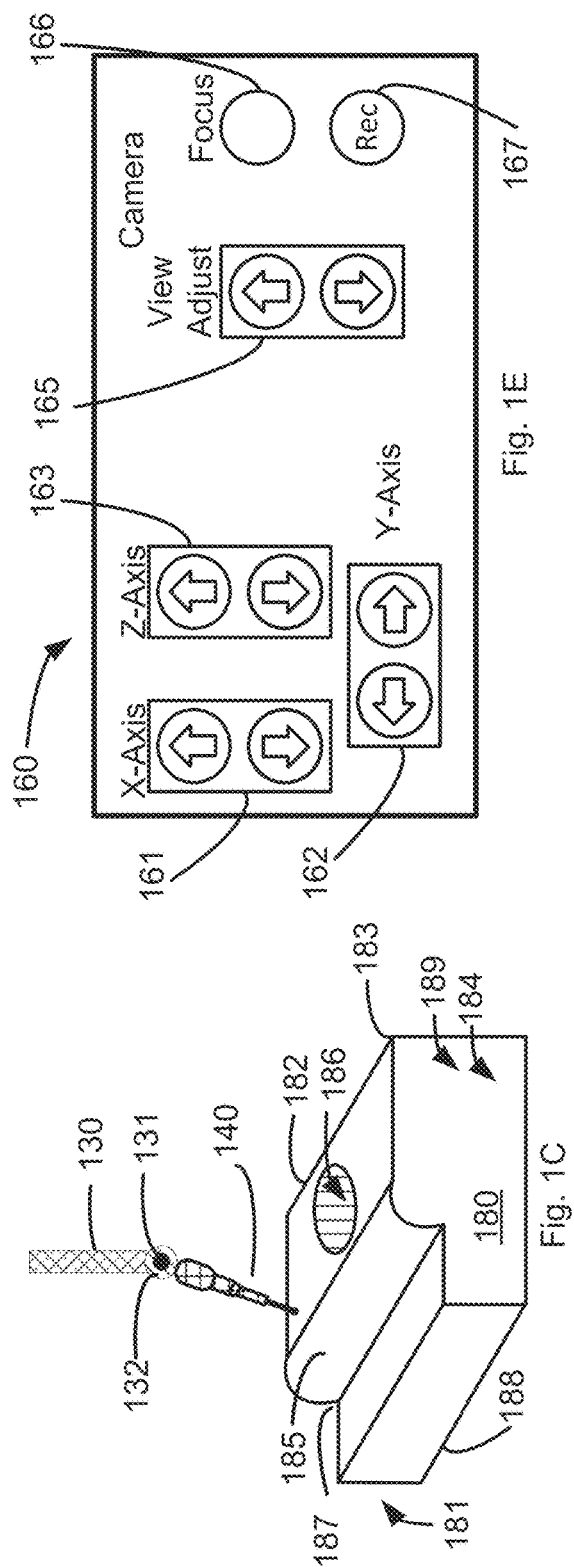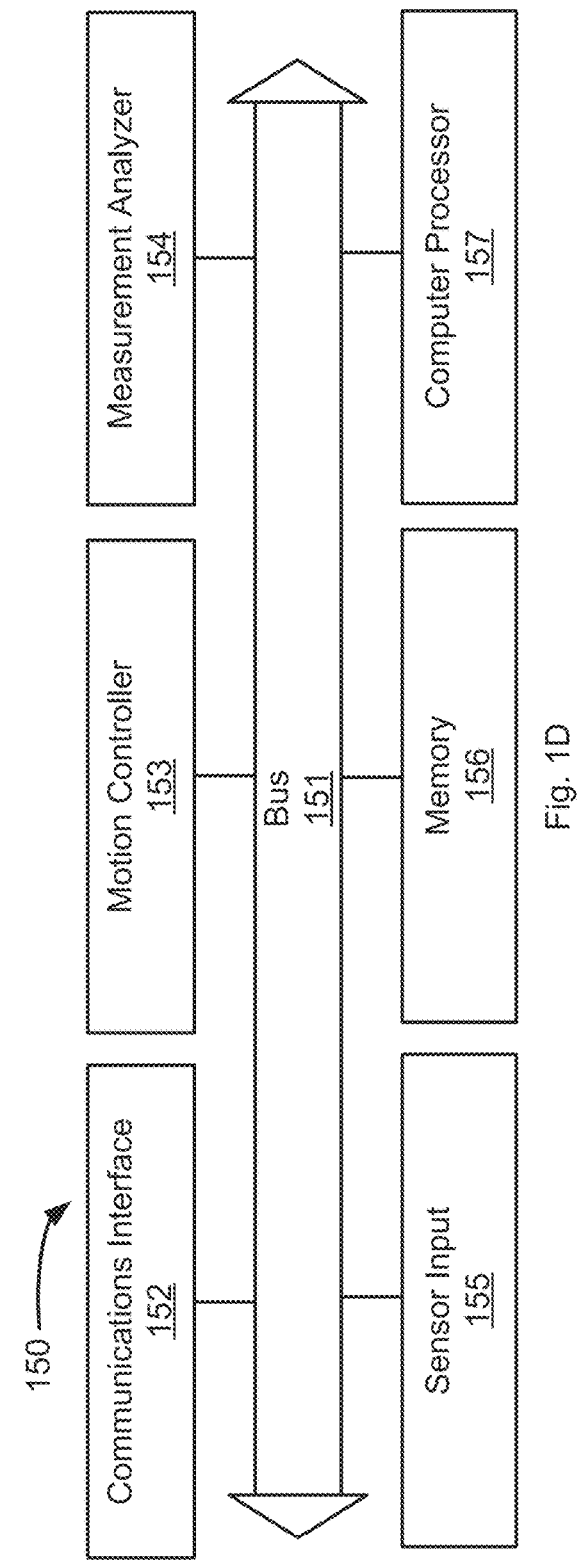

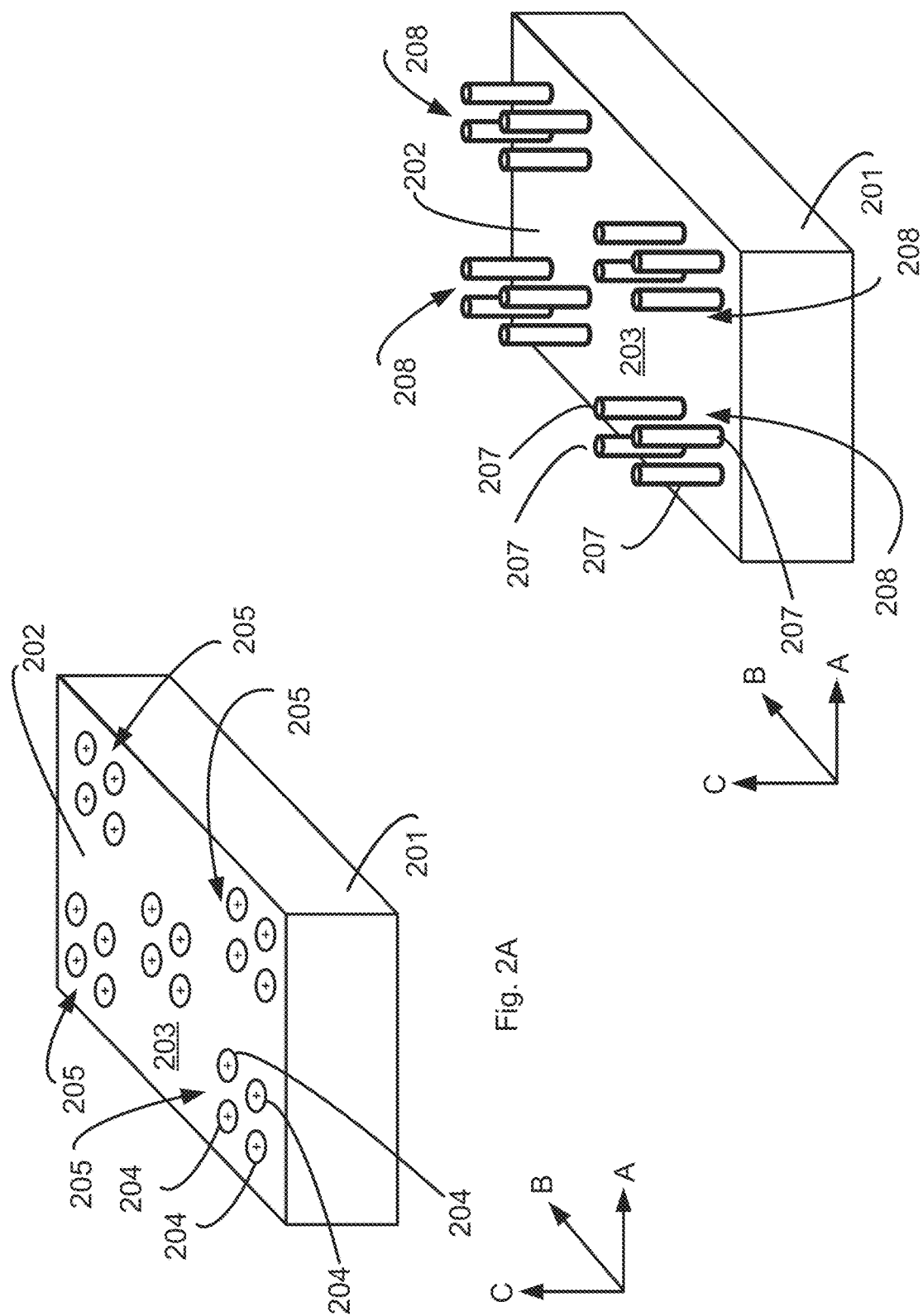

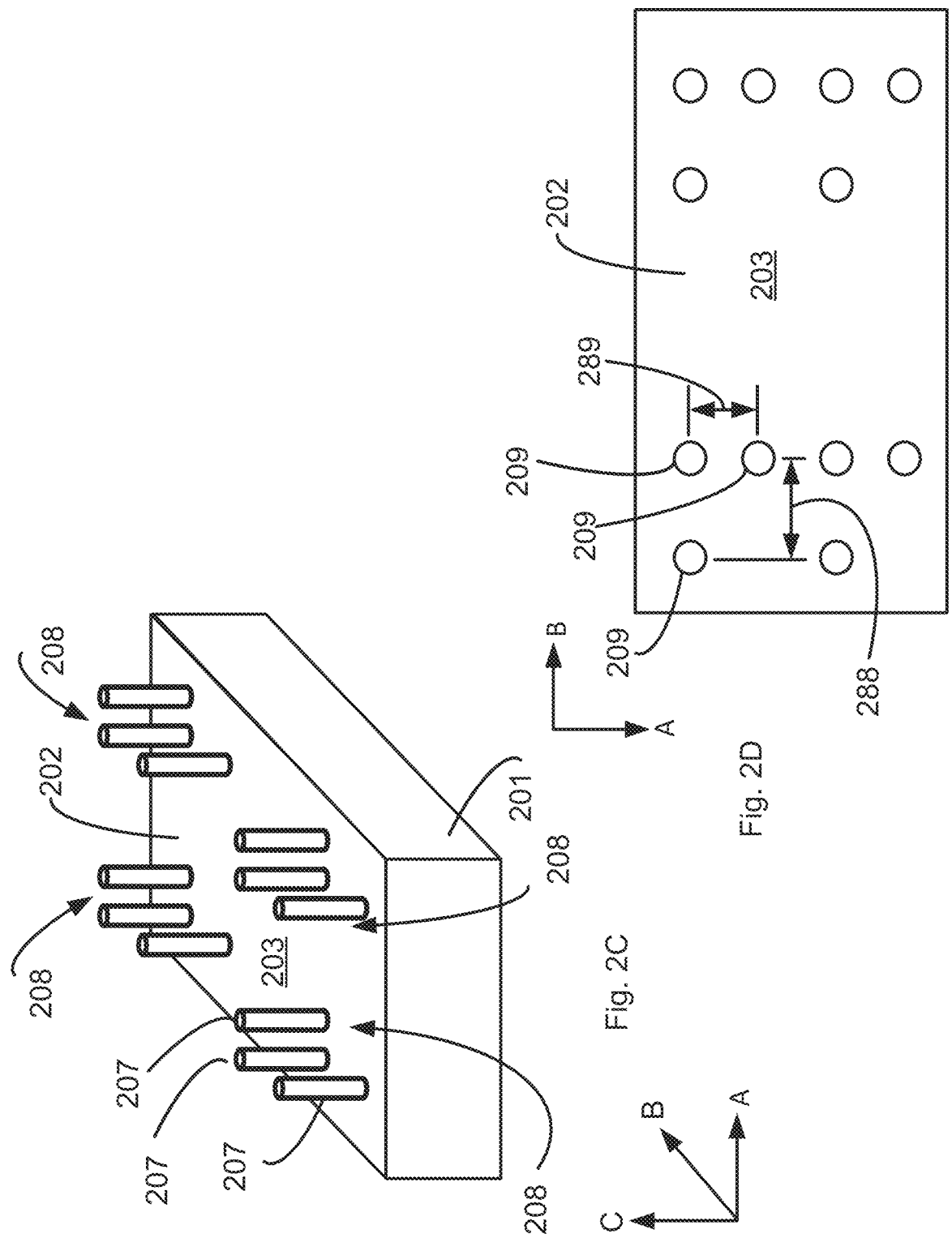

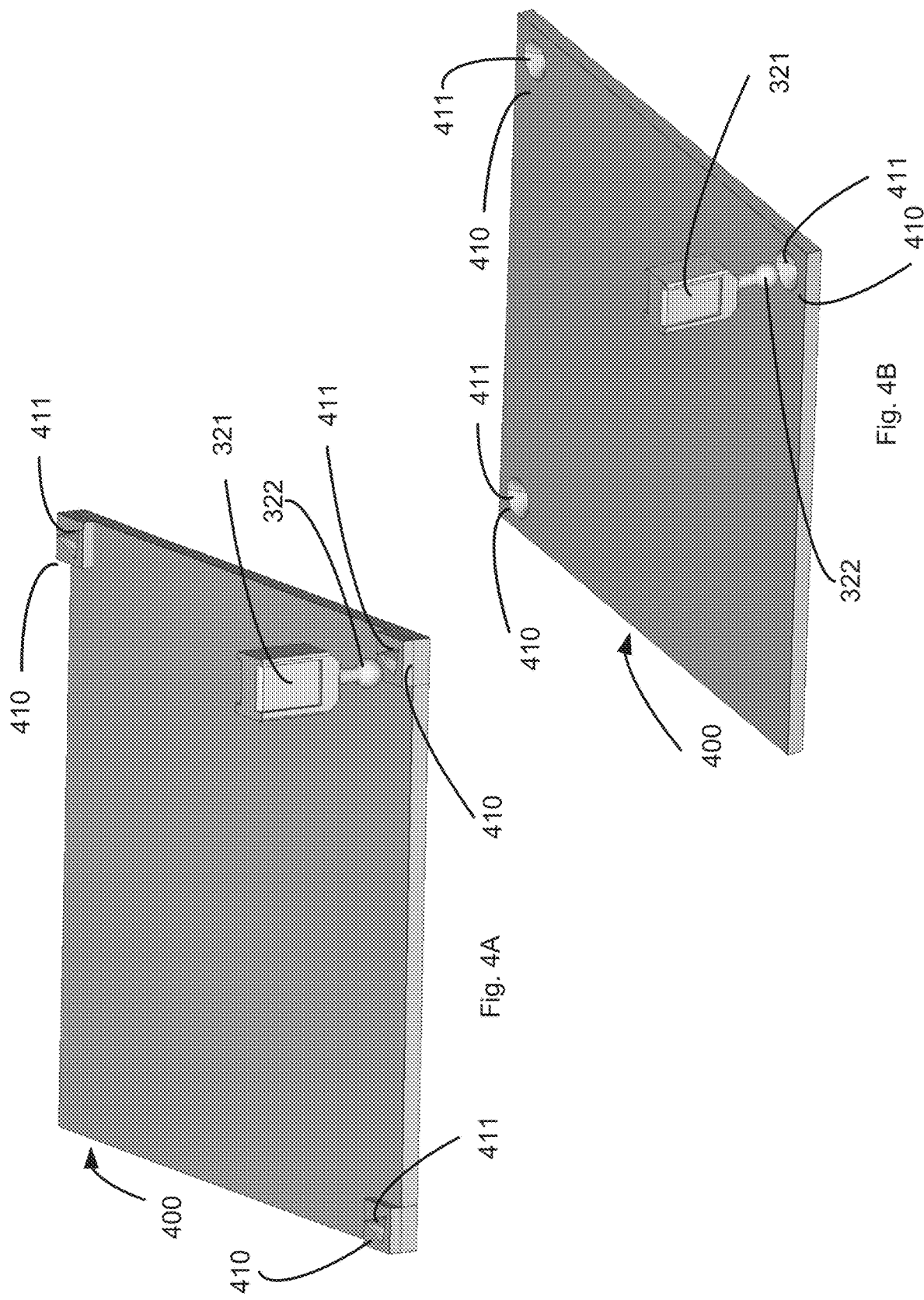

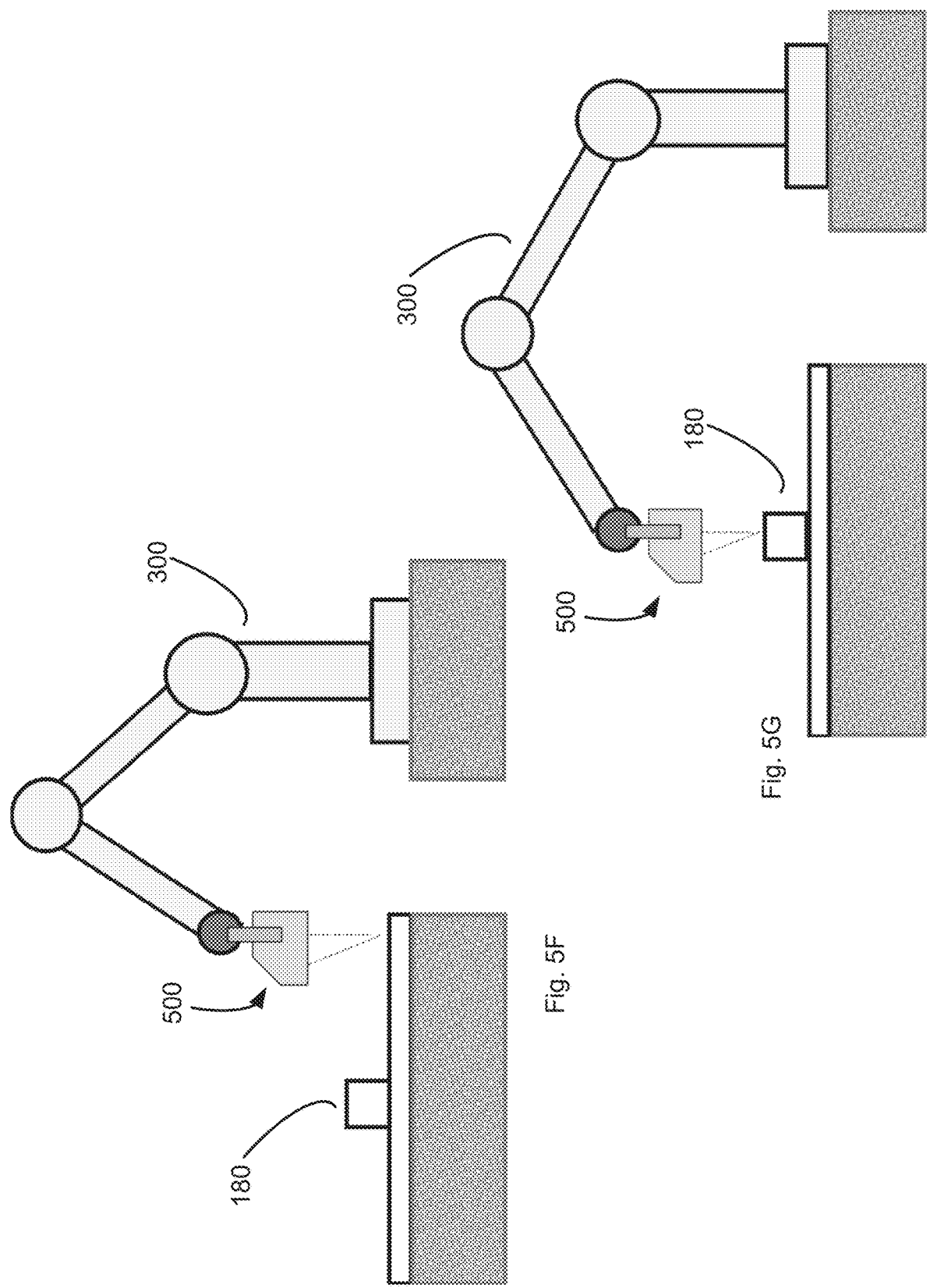

ROBOTIC ALIGNMENT METHOD FOR WORKPIECE MEASURING SYSTEMS

FIELD OF THE INVENTION

The invention generally relates to coordinate measuring machines, more particularly, the invention relates to aligning workpieces on a coordinate measuring machine.

BACKGROUND OF THE INVENTION

Coordinate measuring machines (CMMs) are the gold standard for accurately measuring a wide variety of different types of workpieces. For example, CMMs can measure critical dimensions of aircraft engine components, car engine cylinders, surgical tools, and gun barrels.

Coordinate measuring machines (CMMs) are in common use for dimensional inspection of workpieces. Typically, a workpiece is secured to a table, and a probe, such as one using a touch sensor, is moved in three dimensions by the position system of the CMM within a measurement volume to contact the workpiece at various points. When the probe contacts the workpiece, measuring scales in the Q, R and S directions are read to obtain the position coordinates of the contacted point on the workpiece. By contacting various points on the workpiece, measurements of workpiece features can be obtained. Precise and accurate measurements help ensure that their underlying systems, such as an aircraft in the case of aircraft components, operate as specified.

CMMs typically have a sensor extending from an arm that is movable in up to six dimensions.

Some coordinate measuring machines automatically measure the workpiece, for example according to a pre-programmed routine. Some such pre-programmed routines require that the workpiece be precisely oriented in a pre-defined position and a pre-defined orientation relative to the coordinate measuring machine.

Typically, in operation, an operator places a workpiece to be measured onto the table of a coordinate measuring machine, in the pre-defined position and the pre-defined orientation relative to the coordinate measuring machine, and the coordinate measuring machine subsequently measures a set of physical dimensions of the workpiece according to the pre-programmed routine.

Such coordinate measuring machines suffer from a lack of adaptability in that their operation may degrade, or even fail, if the workpiece is not in the pre-defined position and the pre-defined orientation, or if the coordinate measuring machine falls out of calibration, to name but a few examples.

Moreover, the efficiency and throughput of the operation of the coordinate measuring machine would be desirably improved if such operation could be further automated.

SUMMARY OF VARIOUS EMBODIMENTS

In accordance with one embodiment, a system includes a coordinate measuring machine, a workpiece storage apparatus, and a robotic arm having a robotic arm coordinate system, and is configured for manipulating a set of workpieces for measurement by the coordinate measuring machine. The system includes the robotic arm configurable into an orientation configuration and a placement configuration, wherein in the orientation configuration, the robotic arm deploys a reference geometry tool; and wherein in the placement configuration, the robotic arm deploys a gripper. The system also includes a controller operably coupled to the robotic arm. The controller is configured (a) to receive, from the robotic arm in the orientation configuration, measuring space coordinates of each of a set of CMM datum markers on the coordinate measuring machine; and (b) to define, based on those measuring space coordinates, a measuring space on the coordinate measuring machine relative to the coordinate system of the robotic arm; and subsequently (c) to operate the robotic arm in the placement configuration to retrieve sequentially, from a storage space, each workpiece in the set of workpieces, and to place each such workpiece into the measuring space of the coordinate measuring machine. In illustrative embodiments, the set of CMM datum markers includes at least three such datum markers at three different locations on the CMM.

In some embodiments, in the orientation mode, the controller is further configured to receive, from the robotic arm in the orientation configuration, storage space coordinates of each of a set of storage datum markers on the storage apparatus and to define, based on those storage space coordinates, the storage space.

In some embodiments, the CMM datum markers are disposed on (i) a CMM or (ii) a pallet; and each CMM datum marker of the set of set of CMM datum markers includes a kinematic locator having a kinematic cavity. For example, in various embodiments, the kinematic cavity is one of (a) a rounded cavity or (b) a conical cavity. In such embodiments, the reference geometry tool includes a tip having a tip geometry that fits precisely into the kinematic cavity to become kinematically constrained by the kinematic cavity for determining precise coordinate positions with respect to a robot reference system. In some such embodiments, the tip geometry includes a sphere that fits precisely into the kinematic cavity such that the convex surface is kinematically constrained by the kinematic cavity.

In alternative embodiments, the reference geometry tool includes a kinematic cavity and each CMM datum marker of the set of CMM datum marker includes a kinematic locator having a convex surface, such that the kinematic cavity is configured to engage the convex surface of the CMM kinematic locator such that the kinematic cavity is kinematically constrained by the convex surface.

In some embodiments, the reference geometry tool is permanently affixed at a designated position at the end of the robot arm or its end effector. In other embodiments, the reference geometry tool is removably coupled to a designated position at the end of the robot arm or its end effector.

In yet other embodiments, the robotic arm simultaneously includes both the gripper and the reference geometry tool, and in the orientation configuration, the robotic arm deploys the reference geometry tool at a distal end of the arm; and in the placement configuration, the gripper the robotic arm deploys the gripper at the distal end of the arm. In some such embodiments, the robotic arm includes a carousel, and both the gripper and the reference geometry tool are simultaneously disposed on the carousel, and the controller is configured to (a) in the orientation configuration, configure the carousel such that the reference geometry tool is disposed at the distal end of the arm; and (b) in the placement configuration, configure the carousel such that the gripper is disposed at the distal end of the arm.

In other embodiments, the reference geometry tool includes an illuminator head that has a first source of visible light configured to project a visible X pattern at a first angle relative to the robotic arm, the X pattern defining a coincident point; and a second source of visible light configured to project a visible line at a second angle relative to the robotic arm. In such embodiments, the second angle is different from the first angle, such that the visible line intersects the coincident point at a known distance from the illuminator head.

Another embodiment includes a computer-implemented method of operating a measurement system having a coordinate measuring machine including a measuring volume, a workpiece storage apparatus, and a workpiece handling robot having a robot coordinate system. The method includes defining a coordinate system common to a measuring space of the coordinate measuring machine, the workpiece storage apparatus, and the workpiece handling robot. In some embodiments, the act of defining the coordinate system includes orienting the robot to the measuring space of the coordinate measuring machine by, for each CMM datum marker in a set of CMM datum markers on the coordinate measuring machine, locating the CMM datum marker in the robot coordinate system, and recording the location of the CMM datum marker. Orienting the robot to the workpiece storage apparatus includes, for each storage datum marker in a set of storage datum markers, locating the storage datum marker in the robot coordinate system, and recording the location of the storage datum marker. In such embodiments, locating each of a plurality of storage datum marker on the workpiece storage apparatus and locating each of a plurality of CMM datum marker on the coordinate measuring machine defines the coordinate system common to a measuring space of the coordinate measuring machine, the workpiece storage apparatus, and the workpiece handling robot. The common coordinate system enables the robot to accurately retrieve a workpiece from the workpiece storage apparatus and accurately place that workpiece onto a measuring volume of the coordinate measuring machine.

Some embodiments further include automatically retrieving a first workpiece from the workpiece storage apparatus; automatically placing the first workpiece onto the measuring volume of the coordinate measuring machine; and automatically measuring the first workpiece with the coordinate measuring machine.

Some embodiments of the method include, prior to orienting the robot to the workpiece storage apparatus and prior to orienting the robot to the measuring space of the coordinate measuring machine, configuring the robot into an orientation configuration, in which the robot includes a reference geometry tool. In such embodiments, locating each of a plurality of storage datum markers on the workpiece storage apparatus includes locating each of the plurality of storage datum marker on the workpiece storage apparatus with the reference geometry tool; and locating each of a plurality of CMM datum markers on the coordinate measuring machine includes locating each of a plurality of CMM kinematic locators on the coordinate measuring machine with the same reference geometry tool. In some embodiments, the act of locating a storage datum marker and/or locating a CMM datum marker is done by an operator manually moving the reference geometry tool to kinematically seat the reference geometry tool into the storage datum marker and/or into the CMM datum marker, for example by manually manipulating a robotic arm or the reference geometry tool, or by using a manual user interface on a coordinate measuring machine. In some embodiments, such as where a robot using a reference geometry tool already has a previously-established orientation to a storage apparatus and/or a coordinate measuring machine, the act of locating a storage datum marker and/or locating a CMM datum marker may be performed automatically by the robot using a kinematic device and force sensing, for example to update or fine-tune the respective previously-established orientation.

In some embodiments of such a method, each of the plurality of storage datum markers on the workpiece storage apparatus includes a storage kinematic locator and each of a plurality of CMM datum markers on the coordinate measuring machine includes a CMM kinematic locator. Locating each of the plurality of storage kinematic locators on the workpiece storage apparatus includes manually controlling the robot to seat a shaped tip of the reference geometry tool into each of the plurality of storage kinematic locators such that the shaped tip is kinematically constrained by the kinematic locator (e.g., in at least two dimensions, and in some embodiments 2.5 dimensions) with each such storage kinematic locator; and locating each of the plurality of CMM kinematic locators on the coordinate measuring machine includes manually controlling the robot to kinematically seat the shaped tip of the reference geometry tool into each of the plurality of CMM kinematic locators, such that the shaped tip is kinematically constrained by each such CMM kinematic locator.

Some embodiments further include, prior to retrieving a first workpiece from the workpiece storage apparatus: configuring the robot into a placement configuration, in which the robot includes a gripper disposed to grip a workpiece; and after configuring the robot into the placement configuration: retrieving a first workpiece from the workpiece storage apparatus by controlling the robot to automatically grip the first workpiece with the gripper; and placing the first workpiece onto the coordinate measuring machine within the measuring volume of the coordinate measuring machine by controlling the robot to automatically move the first workpiece from the workpiece storage apparatus to the coordinate measuring machine.

Further, some such methods also include, after measuring the first workpiece with the coordinate measuring machine: automatically, using the robot, removing the first workpiece from the coordinate measuring machine; automatically, using the robot, retrieving a second workpiece from the workpiece storage apparatus; automatically, using the robot, placing the second workpiece onto the coordinate measuring machine within the measuring volume of the coordinate measuring machine; and measuring the second workpiece with the coordinate measuring machine.

In some embodiments, removing the first workpiece from the coordinate measuring machine further includes replacing the first workpiece to its original location the workpiece storage apparatus. In some embodiments, removing the first workpiece from the coordinate measuring machine further includes placing the first workpiece to a location other than its original location the workpiece storage apparatus.

Some embodiments further include, prior to orienting the robot to the measuring space of the coordinate measuring machine, placing onto the coordinate measuring machine a plurality of CMM kinematic locators, each of the plurality of CMM kinematic locator spaced from one another the measurement space of the coordinate measuring machine.

Another embodiment includes a system for measuring a set of workpieces. The system includes a coordinate measuring machine; a workpiece storage apparatus configured to store a set of workpieces; and a workpiece placement robot disposed within reach of both a measuring space of the coordinate measuring machine and the workpiece storage apparatus. The system also includes a controller in control communication with the coordinate measuring machine, and the workpiece placement robot. The controller is configured to: respond to operator control to operate the workpiece placement robot to establish a common reference coordinate system among the coordinate measuring machine, the workpiece storage apparatus, and the workpiece placement robot and, after establishing the common reference coordinate system, to automatically: locate a plurality of workpieces at the workpiece storage apparatus, and sequentially, for each of the plurality of workpieces: operate the placement robot to move the workpiece to the coordinate measuring machine; and operate the coordinate measuring machine to measure the workpiece.

In some such embodiments, controller is further configured to operate the placement robot to automatically return the workpiece to the workpiece storage apparatus.

Some embodiments are configured to automatically refine or update a previously-established orientation of the robot to the coordinate measuring machine and/or storage apparatus. Such embodiments may be particularly useful when the storage apparatus is an automatic guided vehicle ("AGV") to refine the location of the robot and/or AGV to the coordinate measuring machine.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 1B schematically illustrates an embodiment of a coordinate measuring machine;

FIG. 1C schematically illustrates an embodiment of a workpiece;

FIG. 1D an embodiment of a control system for a coordinate measuring machine;

FIG. 1E schematically illustrates an embodiment of a manual user interface for a coordinate measuring machine;

FIG. 2A schematically illustrates an embodiment of a storage plate for storing workpiece holding apparatuses;

FIG. 2B schematically illustrates another embodiment of a storage plate for storing workpiece holding apparatuses;

FIG. 2C and FIG. 2D schematically illustrate another embodiment of a storage plate for storing workpiece holding apparatuses;

FIG. 4A, FIG. 4B and FIG. 4C schematically illustrate embodiments of kinematic locators;

FIG. 5E, FIG. 5F and FIG. 5G each schematically illustrates an illuminator head in operation;

DESCRIPTION OF ILLUSTRATIVE EMBODIMENTS

Figure 1A:
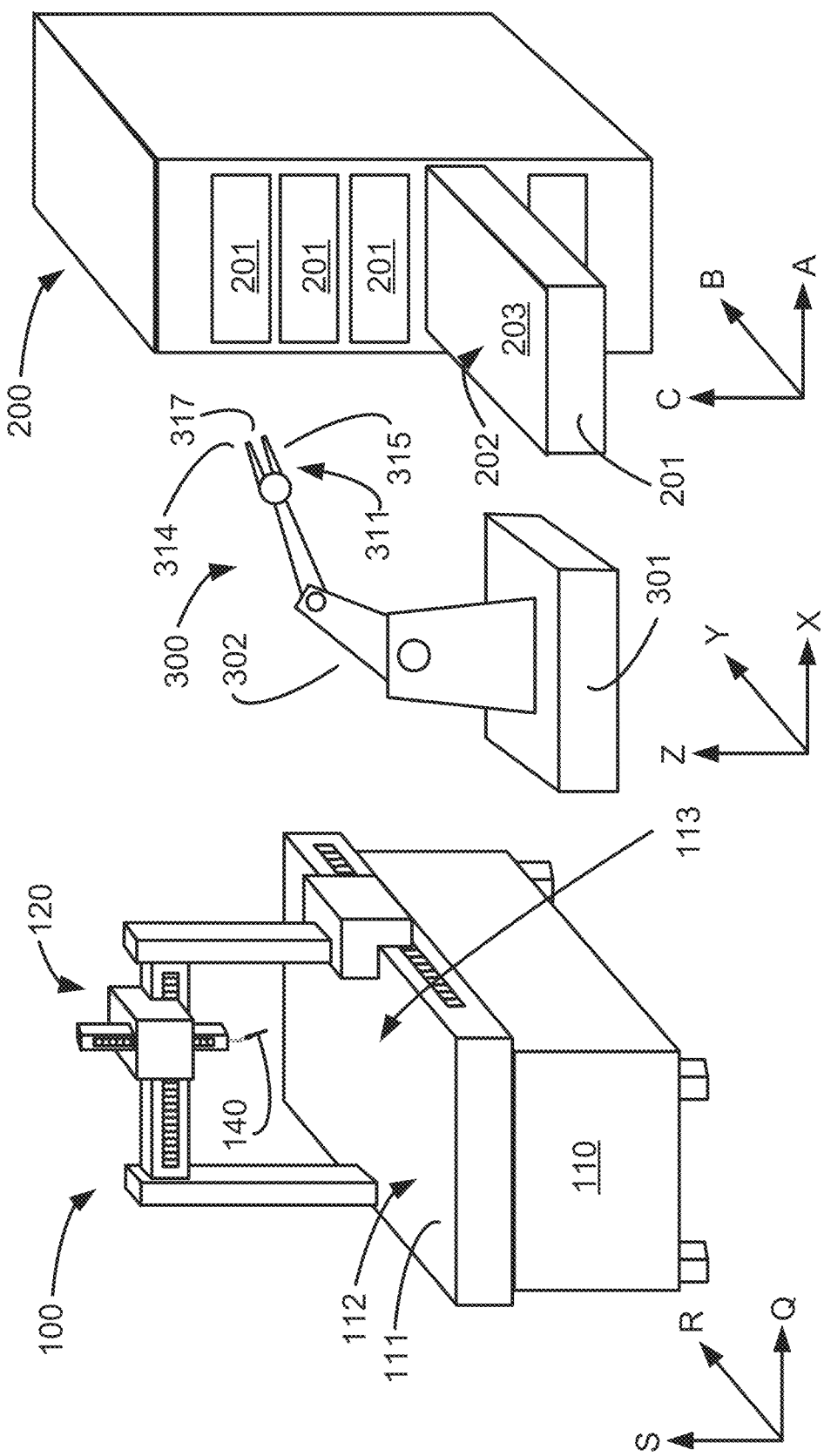
FIG. 1A schematically illustrates a coordinate measuring machine, a robot and a storage unit for storing workpieces.

Various embodiments include methods and apparatuses to create reference systems for part-storage apparatuses, coordinate measuring machines, and/or systems to be accessed by a robot. Such methods and apparatuses enable a robot to be oriented to a part-storage apparatus and/or a coordinate measuring machine without requiring such part-storage apparatus and/or a coordinate measuring machine to conform with pre-defined spacing and orientation requirements with respect to one another or the robot. This enables the part-storage apparatus and/or a coordinate measuring machine to be easily and efficiently placed and oriented, relative to the robot, without having to be carefully positioned and oriented according to such pre-defined specifications. Among other things, this allows a subsequent part-storage apparatus to quickly and efficiently replace a previous part-storage apparatus, because the robot can quickly be oriented to the subsequent part-storage apparatus such that the subsequent part-storage apparatus is defined within the robot's coordinate system.

Some industrial processes, such as measuring workpieces, a workpiece storage apparatus holding workpieces is delivered and positioned near a robot and another machine, such as a coordinate measuring machine. Unless the workpiece storage apparatus is positioned very precisely, and oriented with a high degree of precision, relative to the robot, the robot will not be able to accurately retrieve workpieces from the workpiece storage facility. Moreover, unless the other machine (e.g., the coordinate measuring machine) is positioned very precisely, and oriented with a high degree of precision, relative to the robot, the robot will not be able to accurately deliver workpieces to the other machine. Consequently, present embodiments alleviate the need for such precision placement of robots, storage apparatuses and other machines, for example by enabling the robot to define a coordinate system that is common to the robot, storage apparatuses and other machines. Beneficially, embodiments enable delivery and disposition of a workpiece storage apparatus to a location near the robot (i.e., within reaching distance of the robot) without having precisely position and orient the workpiece storage apparatus relative to the robot. Similarly, embodiments enable delivery and disposition of a robot to a location near the other machine (e.g., near a coordinate measuring machine) without having precisely position and orient the robot relative to the other machine.

To those ends, some embodiments allow a user to set tactile target points (i.e., kinematic locators) on a coordinate measuring machine or a workpiece storage apparatus. The user can then position the robot to determine the precise location, in the robot's coordinate system, of each of the tactile target points. Once done, the robot, and its controller, may be said to have knowledge of the location of the coordinate measuring machine and the workpiece storage facility. Consequently, the robot is enabled to retrieve workpieces from the workpiece storage facility and deliver them to the measuring space of the coordinate measuring machine, for measurement by the coordinate measuring machine.

Other embodiments allow a user to set visual target points on a coordinate measuring machine or a workpiece storage apparatus. The user can then position the robot to determine, using an illuminator head, the precise location, in the robot's coordinate system, of each of the visual target points. Once done, the robot, and its controller, may be said to have knowledge of the location of the coordinate measuring machine and the workpiece storage facility. Consequently, the robot is enabled to retrieve workpieces from the workpiece storage facility and deliver them to the measuring space of the coordinate measuring machine, for measurement by the coordinate measuring machine.

Definitions: As used in this description and the accompanying claims, the following terms shall have the meanings indicated, unless the context otherwise requires.

A "datum marker" is a structure configured to be detected by a reference geometry tool for purposes of determining a location within a coordinate system. Embodiments of "datum marker" described below include a kinematic locator 410 and an optical locator 550. A datum marker may be referred-to by the apparatus on which it is deployed. For example, a "WMM datum marker" is a datum marker disposed on a workpiece measuring machine. For example a CMM datum marker is a WMM datum marker disposed on a coordinate measuring machine. A "storage datum marker" is a datum marker disposed on a storage apparatus.

The term "end effector" is a general term for an apparatus disposed on or integral to a robot arm. For example, one embodiment of an end effector is a mechanism used to hold an object at the end of a robotic arm. An illustrative embodiment of such a mechanism is a gripper with two or more fingers.

The term "independent," when describing two coordinate systems, means that specification of the coordinates of a point in a first one of the coordinate systems is not sufficient, without some additional information, to specify the location of that point with respect to the second one of the coordinate systems. Such additional information may be, for example, a known and fixed relationship between the two coordinate systems, or a translation or transform configured to determine the coordinates of the point in the second one of the coordinate systems based on the specification of the coordinates of the point in the first one of the coordinate systems.

A "kinematic locator" is an object configured to be locatable by the touch of a physical sensor, so as to identify the location of a point within a coordinate system. A kinematic locator may be, but in some embodiments is not, part of an object or workpiece on which a coordinate measuring machine operates. In some embodiments, a kinematic locator includes a physical feature (e.g., a cavity) configured to receive and kinematically constrain a portion (e.g., a shaped tip) of a reference geometry tool, or such as a shaped portion configured to be received by a cavity of a reference geometry tool.

To "kinematically constrain" an object is to prohibit motion of the object in at least two dimensions. For example, motion of a shaped tip may be kinematically constrained in the X-axis of a three-axis Cartesian coordinate system by physically prohibiting motion of the shaped tip by disposing the shaped tip in simultaneous contact with to two opposing sidewalls of the cavity. As another example, motion of a shaped tip may be kinematically constrained in the X-Y plane of a Cartesian coordinate system by prohibiting motion of the shaped tip in the X-axis and the Y-axis by disposing the shaped tip in contact with least three sidewalls of the cavity. As another example in a Cartesian coordinate system, motion of a shaped tip may be kinematically constrained by the kinematic locator in 2.5 dimensions (e.g., along the X-axis in both directions, along the Y-axis in both directions, and along the Z-axis in one direction but not the opposing direction) by prohibiting motion of the shaped tip by disposing the shaped tip in contact with least three sidewalls of a cavity (motion of the shaped tip may be constrained in the opposite direction in the Z-axis by a robot or operator). In some embodiments, a kinematic cavity constrains motion of a reference geometry tool in only 2.5 dimensions (e.g., two directions in the X-axis; two directions in the Y-axis, and one direction in the Z-axis). In such embodiments, the reference geometry tool may be constrained in a remaining direction of the Z-axis by an operator or robot arm, so that the reference geometry tool is constrained in three dimensions.

To "kinematically seat" a first object is to kinematically constrain the motion of the first object by disposing the first object in (or at least partially in) a cavity of another (second) object such that the first object is in contact with sidewalls of the cavity.

To "locate" a kinematic locator means to determine quantitatively the coordinates of the kinematic locator within a coordinate system. In some embodiments, locating a kinematic locator includes seating a portion of reference geometry tool to a cavity of the kinematic locator, and in other embodiments to kinematically seat a portion of a kinematic locator to a cavity in a reference geometry tool. In embodiments that employ an illuminating reference geometry tool, to "locate" an optical locator means to determine quantitatively the coordinates of the optical locator with the illuminating reference tool. Illustrative embodiments record the physical coordinates of the kinematic locator and optical locator, respectively.

A "set" includes at least one member. For example, and without limiting the generality of the definition, a set of workpieces includes at least one workpiece. For example, and without limiting the generality of the definition, a set of locators (e.g., kinematic locators or optical locators) includes at least one locator.

The term "workpiece" means an object to be measured by a coordinate measuring machine, such as a manufactured component, for example.

The workpieces in some illustrative embodiments described below may include jet turbine blades, orthopaedic implants, automotive powertrain components, and consumer electronics, to name but a few examples.

A "workholder" is a device that couples to a workpiece, for example when the workpiece is on a coordinate measurement machine or a storage apparatus, and/or while being moved.

A "workpiece measuring machine" (or "WMM") is an apparatus having a measuring space, and is configurable to automatically measure a workpiece disposed within that measuring space. The term "workpiece measuring machine" encompasses a wide variety of apparatuses, including without limitation coordinate measuring machines; laser measuring machines; optical measuring machines; and machine-vision measuring machines. The term "workpiece measuring machine" includes "multi-sensor" workpiece measuring machine. A "multi-sensor" workpiece measuring machine is a workpiece measuring machine that has more than one type of sensor for measuring a workpiece. For example, one embodiment of a "multi-sensor" workpiece measuring machine is a coordinate measuring machine having both a tactile sensor and a camera or machine-vision sensor.

Overview

In automation applications requiring the transfer of parts (e.g., workpieces 180) between operations, there are often multiple situations where parts must be handled for proper placement into storage containers or holding fixtures before the next operation. This handling of parts during transfer is complicated by the fact that different part handling systems are themselves moveable and must be aligned with each other. These part handling systems might include a storage system 200 (for example, drawer racks, conveyor belts, automatic guided vehicles (AGVs) and robotic arms, among other systems. For example, an AGV might contain a pallet of parts to be delivered to a workpiece measuring machine for an inspection operation. Illustrative embodiments are described using a coordinate measuring machine 100 as an example of a workpiece measuring machine, with the understanding that embodiments are not limited to coordinate measuring machines.

There might also be a robot 300 stationed at the CMM 100 for the retrieval and placement of those parts from the AGV pallet to the CMM holding fixture. In such a scenario, the AGV will need to be able to position itself (park) relative to the robotic arm 302 repeatably enough so that the robotic arm 302 can pick the parts "blindly" from the same location every time. To assist with this process additional hardware for AGVs have been devised such as special docking stations and sensing systems to help with positioning. Otherwise, if the repeatability is not acceptable for the application, the robotic arm will need to find the location of the AGV pallet and or parts with the assistance of other sensing equipment integrated with the robot itself. One such example is a camera system mounted near the robot end effector to "see" the part when trying to pick it. Alternatively, special algorithms may also be implemented to do a double pick sequence or push the part into a corner or pocket to ensure its position before trying to pick it. However, no matter which workaround is implemented, there is always a cost involved when trying to compensate for such part positioning issues. This may be a direct hardware cost, such as a camera system, or indirectly, in the form of complexity and maintenance. Other drawbacks for adding additional sensors or cameras to the robotic arm includes weight that reduces the robot's limited payload. This is especially true of collaborative robots whereby the payload limitations tend to be more restrictive. In terms of complexity, design and integration is yet another issue when using equipment like camera's and part recognition software, since it often takes more experienced resources and additional time to implement a solution.

According to one embodiment, a robotic arm has a reference geometry gripped by its end effector or itself attached as end of arm tooling (EOAT) for the robot. The said reference geometry may be of a sphere or any other regular geometry typical in gauge tool design, for example a cone with a point, a cylinder, etc. Correspondingly, a workpiece to be located, either part or part handling system, contains one or more kinematic locators, whereby the reference geometry may be repeatably positioned into location. This positioning of the robot may be done either manually in the robot's free drive mode or automatically by the robot using force sensing feedback. The kinematic locators may be in the form of, but not limited to, (1) three orthogonally arranged surfaces, (2) an internal cone or conical depression or (3) a triangular arrangement of roll pins (4) a simple round or triangular hole small enough so that the reference geometry cannot pass through it, or (4) any other constraining geometric arrangement forming a "nest" into which the reference geometry on the robot's end of arm may be placed at rest without the ability to move along any of the three axes of a three dimensional coordinate system in which the kinematic locator is disposed (with the exception, in some embodiments, of being able to back-out by reversing the motion that initially caused a reference geometry tool to set with the kinematic locator). The aforementioned method by which reference geometries may be repeatably fit together without the ability to move along any of the three axes (other than the above-mentioned ability to back-out) is an embodiment of being kinematically constrained. The design of the kinematic locators is such that the geometric surfaces mate with each other to become kinematically constrained when the robot's reference geometry can no longer find any free movement along an axis (other than to back out) while applying some preload between the mating surfaces. It may also be noted that the kinematic locator or reference geometry may be reversed for either robot or object, although the most practical arrangement is to have the simplest geometry, such as a sphere, at the end of the robot arm for the purpose of reducing payload and or space while making it easier to interchange.

Once the robot has positioned the sphere or other geometry within each kinematic locator on the workpiece, a precise coordinate position in x, y, and z (where x, y and z represent points, respectively, within a coordinate system of the robot 300 having three orthogonal axes) is, in preferred embodiments, recorded by the robot 300 at each kinematic locator. After recording the coordinates for at least three kinematic locators, a complete coordinate system in three-dimensional space can be determined. Otherwise, partially constrained coordinate systems may also be determined using fewer than three coordinate points. This may be done in situations where positioning errors may only be present in one or a couple of dimensions thereby saving some valuable process time for the robot. For example, an AGV may only have a significant parking error in the direction of motion, therefore it would only be necessary to record a single point at one kinematic locator to establish a reliable origin.

Once the coordinate system is determined, the reference geometry may be removed or placed into a storage location for later use. One aspect of the design is that the reference geometry used may not need to be permanently mounted at the end of the robot arm so that it does not need to get in the way of a robot's other tasks such as picking and placing production parts. Whereas in other applications where part picking interference is not a concern, it may be beneficial to keep permanently attached.

According to another embodiment, a robotic arm has a three-dimensional laser targeting device gripped by its end effector or held by some other type of end of arm tooling (EOAT). The purpose of the three-dimensional laser targeting device is similar to that of the previous reference geometry embodiment in that it can be used to determine precise Q, R, and S point locations on objects. One is that it does not need to be paired with kinematic locators mounted to the part being taught in order to determine a precise location, nor does it require the manual positioning of the gripper on the part. The described laser targeting device can be used quickly and easily at a distance above the part, thereby eliminating steps and complexity in the teaching process. Moreover, in some embodiments, the robot includes a vision system that enables and configures the robot to use the later targeting device to automatically recognize the target mark on the part. In cases where minimal manual interaction is acceptable for system setup purposes, a laser targeting device as described can be extremely beneficial to predetermine the locations of parts in a pallet array so that they can be later automated.

The three-dimensional laser targeting device allows a user or vision system to visually determine the three-dimensional location as well as orientation of an object. Thus, in illustrative embodiments, the laser device is not merely a two-dimensional pair of cross hairs, but instead is also able to indicate or determine its depth to the object. This is accomplished by having at least three laser diode line beams arranged such that at least two of the beams are orthogonal to each other and the remaining beam is not orthogonal to the other two (or either of the other two). The purpose of the first two orthogonal beams is that they assist the user or vision system to (1) determine a precision two-dimensional location on the object surface that coincides at the intersection of the two line beams (crosshair mark) and (2) determine the secondary axis of rotation in the approach direction toward the object (usually thought of as X or Y axes). The third line laser, which is not orthogonal two the first two, has an angle with respect to the approach direction such that its beam coincides with the crosshair of the first two beams when the known depth to the object is reached.

Environment

FIG. 1A schematically illustrates a working environment for various embodiments. As shown the environment includes a coordinate measuring machine 100, and a storage apparatus 200, and a robot 300.

Coordinate Measuring Machine 100

As known by those in the art, a coordinate measuring machine (or "CMM") 100 is a system configured to measure one or more features of a workpiece. Coordinate measuring machines are represented in FIG. 1A by coordinate measuring machine 100.

FIGS. 1B-1E schematically illustrate a coordinate measurement machine 100 (hereinafter "CMM 100") that may be configured in accordance with illustrative embodiments.

As known by those in the art, a CMM is a system configured to measure one or more features of a workpiece 180. An illustrative embodiment of a workpiece 180 is schematically illustrated in FIG. 1C. Typically, a workpiece 180 has a specified shape with specified dimensions, which may be referred-to collectively as the "geometry" 181 of the workpiece 180. As an example, a workpiece 180 may have an edge 182, and a corner 183. A workpiece 180 may also have surfaces, such as a flat surface 184, and a curved surface 185. A meeting of two surfaces may create an inside angle 187. Moreover, each surface may have physical characteristic such as waviness 188 and/or surface finish 189, as known in the art. A workpiece 180 may also have a cavity 186, which may also be an aperture through the workpiece 180. As known in the art, a cavity 186 may have dimensions such as width and depth, which may in turn define an aspect ratio of the cavity 186.

CMM Base

In the illustrative embodiment of FIG. 1A, the CMM 100 includes a base 110 having a table 111. The table 111 of the CMM 100 defines an A-R plane 112 that typically is parallel to the plane of the floor 101, and an S-axis normal to the A-R plane, and a corresponding Q-S plane and R-S plane. The table 111 also defines a boundary of a measuring space 113 above the table 111. In some embodiments, the CMM 100 includes a probe rack 115 configured to hold one or more measuring sensors 140. A moveable part of the CMM 100 may move to the probe rack 115 and place a measuring sensor 140 into the probe rack 115, and/or remove another measuring sensor 140 from the probe rack 115.

Moveable Parts

The CMM 100 also has movable features (collectively, 120) arranged to move and orient a measuring sensor 140 (and in some embodiments, a plurality of such devices) relative to the workpiece 180. As described below, movable features of the CMM 100 are configured to move and orient the measuring sensor 140, relative to the workpiece 180, in one dimension (Q-axis; R-axis; or S-axis), two dimensions (Q-R plane; Q-S plane; or R-S plane), or three dimensions (a volume defined by the Q-axis, R-axis, and S-axis). Accordingly, the CMM 100 is configured to measure the location of one or more features of the workpiece 180.

The CMM 100 of FIG. 1B is known as a "bridge" CMM. Movable features 120 of the bridge CMM 100 include a bridge 123 movably coupled to the base 110 by legs 121. The bridge 123 and legs 121 are controllably movable relative to the base 110 along the R-axis.

To facilitate motion of the legs relative to the base 110, the legs 121 may be coupled to the base 110 by one or bearings 128. As known in the art, a bearing may be a roller bearing or an air bearing, to name but a few examples.

The movable features also include a carriage 125 movably coupled to the bridge 123. The carriage is configured to controllably move in the Q-axis along the bridge 123. The position of the carriage 125 along the bridge 123 may be determined by a bridge scale 124 operably coupled to the bridge 123.

A spindle 126 is moveably coupled to the carriage 125. The spindle 126 is configured to controllably move in the S-axis. The position in the S-axis of the spindle 126 may be determined by a spindle scale 127 operably coupled to the spindle 126. The measuring sensor 140 is operably coupled to the spindle 126. Consequently, the measuring sensor 140 is controllably movable in three dimensions relative to a workpiece 180 in the measuring space 113.

In some embodiments, the measuring sensor 140 is moveably coupled to the spindle 126 by an articulated arm 130. For example, the measuring sensor 140 may be movably coupled to the arm 130 by a movable joint 131. The moveable joint 131 allows the orientation of the measuring sensor 140 to be controllably adjusted relative to the arm 130, to provide to the measuring sensor 140 additional degrees of freedom in the Q-axis, R-axis, and/or S-axis.

In other embodiments, which may be generally referred-to as "gantry" CMMs, the legs 121 stand on the floor 101, and the measuring space 113 is defined relative to the floor 101.

In yet other embodiments, the measuring sensor 140 is fixed to (i.e., not movable relative to) the base 110, and the table 111 is movable in one, two or three dimensions relative to the measuring sensor 140. In some coordinate measuring machines, the table 111 may also be rotatable in the Q-R plane. In such embodiments, the CMM 100 moves the workpiece 180 relative to the measuring sensor.

In other embodiments, which may be generally referred-to as "horizontal arm" CMMs, the bridge 123 is movably coupled to the base 110 to extend in the S-axis, and to be controllably movable along the R-axis. In such a CMM, the arm 130 is controllably extendable in the S-axis, and controllably movable up and down the bridge 123 in the S-axis.

In yet other embodiments, the arm 130 is articulated. One end of the arm 130 is fixed to the base 110, and a distal end of the arm 130 is movable relative to the base 110 in one, two or three dimensions relative to a workpiece 180 in the measuring space 113.

Sensors

In some embodiments, the measuring sensor 140 may be a tactile probe (configured to detect the location of a point on the workpiece 180 by contacting a probe tip to the workpiece 180, as known in the art), a non-contact probe (configured to detect the location of a point on the workpiece 180 without physically contacting the workpiece 180), such as a capacitive probe or an inductive probe as known in the art, or an optical probe (configured to optically detect the location of a point on the workpiece 180), to name but a few examples.

In some embodiments, the measuring sensor 140 is a vision sensor that "sees" the workpiece 180. Such a vision sensor may be a camera capable of focusing on the workpiece 180, or the measurement area 113, and configured to capture and record still images or video images. Such images, and/or pixels within such images, may be analyzed to locate the workpiece 180; determine the placement and/or orientation of the workpiece 180; identify the workpiece 180; and/or measure the workpiece 180, to name but a few examples.

Some embodiments of a CMM 100 may include one, or more than one, camera 141 configured such that the measurement envelope 113 is within the field of view of the camera 141. Such a camera 141 may be in addition to a measuring sensor 140. The camera 141 may be a digital camera configured to capture still images and/or video images of the measurement envelope 113, a workpiece 180 on the CMM 100, and/or the environment around the CMM 100. Such images may be color images, black and white images, and/or grayscale image, and the camera 141 may output such images as digital data, discrete pixels, or in analog form.

Some embodiments of a CMM 100 may also include an environmental sensor 142 configured to measure one or more characteristics of the environment 102 in which the CMM is placed, and some embodiments may have more than one such environmental sensor 142. For example, an environmental sensor 142 may be configured to measure the temperature, pressure, or chemical content of the environment 102 around the CMM 100. An environmental sensor 142 may also be a motion sensor, such as an accelerometer or a gyroscope, configured to measure vibrations of the CMM caused, for example, the by motion of people or objects near the CMM 100. An environmental sensor 142 may also be a light detector configured to measure ambient light in the environment 102, which ambient light might, for example, interfere with the operation of an optical sensor or vision sensor. In yet another embodiment, an environmental sensor 142 may be sound sensor, such as a microphone, configured to detect sound energy in the environment.

In operation, the CMM 100 measures the workpiece 180 by moving the measuring sensor 140 relative to the workpiece 180 to measure the workpiece 180.

CMM Control System

Some embodiments of a CMM 100 include a control system 150 (or "controller" or "control logic") configured to control the CMM 100, and process data acquired by the CMM. FIG. 1D schematically illustrates an embodiment of a control system 150 having several modules in electronic communication over a bus 151.

In general, some or all of the modules may be implemented in one or more integrated circuits, such as an ASIC, a gate array, a microcontroller, or a custom circuit, and at least some of the modules may be implemented in non-transient computer-implemented code capable of being executed on a computer processor 157.

Some embodiments include a computer processor 157, which may be a microprocessor as available from Intel Corporation, or an implementation of a processor core, such as an ARM core, to name but a few examples. The computer processor 157 may have on-board, non-transient digital memory (e.g., RAM or ROM) for storing data and/or computer code, including non-transient instructions for implementing some or all of the control system operations and methods. Alternately, or in addition, the computer processor 157 may be operably coupled to other non-transient digital memory, such as RAM or ROM, or a programmable non-transient memory circuit for storing such computer code and/or control data. Consequently, some or all of the functions of the controller 150 may be implemented in software configured to execute on the computer processor.

The control system 150 includes a communications interface 152 configured to communicate with other parts of the CMM 100, or with external devices, such as computer 170 via communications link 176. To that end, communications interface 152 may include various communications interfaces, such as an Ethernet connection, a USB port, or a Firewire port, to name but a few examples.

The control system 150 also includes a sensor input 155 operably coupled to one or more sensors, such as a measuring sensor 140 or camera 141. The sensor input 155 is configured to receive electronic signals from sensors, and in some embodiments to digitize such signals, using a digital to analog ("D/A") converter. The sensor input 155 is coupled to other modules of the control system 150 to provide to such other modules the (digitized) signals received from sensors.

The motion controller 153 is configured to cause motion of one or more of the movable features of the CMM 100. For example, under control of the computer processor 157, the motion controller 153 may send electrical control signals to one or more motors within the CMM 100 to cause movable features of the CMM 100 to move a measuring sensor 140 to various points within the measuring space 113 and take measurements of the workpiece 180 at such points. The motion controller 153 may control such motion in response to a measurement program stored in memory module 156, or stored in computer 170, or in response to manual control by an operator using manual controller 160, to name but a few examples.

Measurements taken by the CMM 100 may be stored in a memory module 156, which includes a non-transient memory. The memory module 156 is also configured to store, for example, a specification for a workpiece 180 to be measured; a specification for a calibration artifact; an error map; and non-transient instructions executable on the computer processor 157, to name but a few examples. Such instructions may include, among other things, instructions for controlling the moveable features of the CMM 100 for measuring a workpiece 180 and/or a calibration artifact; instructions for analyzing measurement data; and instructions for correcting measurement data (e.g., with an error map).

The measurement analyzer 154 is configured to process measurement data received from one or more sensors, such as measuring sensor 140. In some embodiments, the measurement analyzer 154 may revise the measurement data, for example by modifying the measurement data using an error map, and/or compare the measurement data to a specification, for example to assess deviation between a workpiece 180 and a specification for that workpiece 180. To that end, the measurement analyzer 154 may be a programmed digital signal processor integrated circuit, as known in the art.

Alternately, or in addition, some embodiments couple the CMM 100 with an external computer (or "host computer") 170. In a manner similar to the control system 150, the host computer 170 has a computer processor such as those described above, and non-transient computer memory 174, in communication with the processor of the CMM 100. The memory 174 is configured to hold non-transient computer instructions capable of being executed by the processor, and/or to store non-transient data, such as data acquired as a result of the measurements of an object 180 on the base 110.

Among other things, the host computer 170 may be a desktop computer, a tower computer, or a laptop computer, such as those available from Dell Inc., or even a tablet computer, such as the iPad™ available from Apple Inc. In addition to the computer memory 174, the host computer 170 may include a memory interface 175, such as a USB port or slot for a memory card configured to couple with a non-transient computer readable medium and enable transfer of computer code or data, etc. between the computer 170 and the computer readable medium.

The communication link 176 between the CMM 100 and the host computer 170 may be a hardwired connection, such as an Ethernet cable, or a wireless link, such as a Bluetooth link or a Wi-Fi link. The host computer 170 may, for example, include software to control the CMM 100 during use or calibration, and/or may include software configured to process data acquired during operation of the CMM 100. In addition, the host computer 170 may include a user interface configured to allow a user to manually operate the CMM 100. In some embodiments, the CMM and/or the host computer 170 may be coupled to one or more other computers, such as server 179, via a network 178. The network 178 may be a local area network, or the Internet, to name but two examples.

Because their relative positions are determined by the action of the movable features of the CMM 100, the CMM 100 may be considered as having knowledge of the relative locations of the base 110, and the workpiece 180. More particularly, the computer processor 157 and/or computer 170 control and store information about the motions of the movable features. Alternately, or in addition, the movable features of some embodiments include sensors that sense the locations of the table 111 and/or measuring sensor 140, and report that data to the computer 170 or controller 150. The information about the motion and positions of the table and/or measuring sensor 140 of the CMM 100 may be recorded in terms of a one-dimensional (e.g., Q R, S), two-dimensional (e.g., Q-R; Q-S; R-S) or three-dimensional (Q-R-S) coordinate system referenced to a point on the CMM 100.

Manual User Interface

Some CMMs also include a manual user interface 160. As shown in FIG. 1E, the manual user interface 160 may have controls (e.g., buttons; knobs, etc.) that allow a user to manually operate the CMM 100. Among other things, the interface 160 may include controls that enable the user to change the position of the measuring sensor 140 relative to the workpiece 180. For example, a user can move the measuring sensor 140 in the Q-axis using controls 161, in the R-axis using controls 162, and/or in the S-axis using controls 163.

If the measuring sensor 140 is a vision sensor, or if the CMM 141 includes a camera 141, then the user can manually move the sensor 140, camera 141, or change field of view of the vision sensor and/or camera using controls 165. The user may also focus the vision sensor and/or camera 141 using control 166 (which may be a turnable knob in some embodiments) and capture and image, or control recording of video, using control 167.

As such, the movable features may respond to manual control, or be under control of the computer processor 157, to move the base 110 and/or the measuring sensor 140 relative to one another. Accordingly, this arrangement permits the object being measured to be presented to the measuring sensor 140 from a variety of angles, and in a variety of positions.

Embodiments of a CMM 100 include a mobile controller which may be referred-to as a jogbox (or "pendant") 190. The jogbox 190 includes a number of features that facilitate an operator's control of the coordinate measuring machine 100.

The jogbox 190 is not affixed to the coordinate measuring machine 100 in that its location is movable relative to the coordinate measuring machine 100. The mobility of the jogbox 190 allows an operator of the coordinate measuring machine 100 to move relative to the coordinate measuring machine 100, and relative to a workpiece 180 on which the coordinate measuring machine 100 operates. Such mobility may allow the operator to move away from the coordinate measuring machine 100 for safety reasons, or to get a broader view of the coordinate measuring machine 100 or the workpiece 180. The mobility of the jogbox 190 also allows the operator to move closer to the coordinate measuring machine 100 and the workpiece 180 on which it operates than would be possible using a fixed control console or computer 170, in order, for example, to examine or adjust the location or orientation of the workpiece 180, or the operation of the coordinate measuring machine 100.

To that end, the jogbox 190 is in data communication with the control system 150, and may be movably coupled to the control system 150 by a tether 191. In some embodiments, the jogbox 190 is in data communication with the communications interface 152 of the control system 150 via a tether 191 (which may be an Ethernet cable, a USB cable, or a Firewire cable, to name but a few examples), as schematically illustrated in FIG. 1B, and in other embodiments the jogbox 190 is in data communication with the communications interface 152 of the control system 150 via a wireless communications link, such as a Bluetooth connection, etc.

Storage Apparatus 200

One or more workpieces 180 are stored in storage apparatus (or system) 200. In this embodiment, the storage system 200 includes one or more drawers (or shelves) 201. The storage system defines a storage system coordinate system having three mutually orthogonal axes (axes A, B, and C in FIG. 1A). The storage system coordinate system is independent of the CMM's coordinate systems (e.g., Q-R-S).

As schematically illustrated in FIG. 1A, each drawer or shelf 211 of a storage system 200 may have one or more storage plates 203 configured and disposed to hold the one or more workpieces 180. A storage plate 203 may have a plate surface 202.

In some embodiments, a storage plate 203 has a metal surface 202 such that a magnet would be attracted to the surface 202 of the storage plate 203. In other embodiments, the storage plate 203 has a non-metal and non-magnetic surface, which surface neither attracts nor repels a magnet.

Another embodiment of a storage plate 203 is schematically illustrated in FIG. 2B, and includes in or at its surface 202 a set of metal buttons 204. In one embodiment, the metal button 204 is a magnet. Each magnet metal button 204 has two surfaces, with a positive polarity on one surface, and a negative polarity on the opposing surface. The metal buttons 204 serve to hold a workpiece 180, or workholding apparatus holding a workpiece 180 to the surface 202, for example when placed on the surface 202 by the robot 300. For example, in embodiments in which the metal button 204 is a magnet, each metal button 204 may be magnetically attracted to a counterpart metal button or magnet on the surface 202. In embodiments in which the metal button 204 is a not magnet, each such metal button 204 may be magnetically attracted to a counterpart magnetic button on the surface 202.

In preferred embodiments, several magnets 204 are arranged in a magnet group 205 (FIG. 2A), and the storage plate 203 includes several such magnet groups 205. In illustrative embodiments, the magnets 204 in each magnet group 205 are arranged in a magnet pattern that mirrors a pattern of holder magnets in a workpiece 180 or a workholder apparatus.

Another embodiment of a storage plate 203 is schematically illustrated in FIG. 2B, and includes, extending from its surface 202, several dowels 207.

In preferred embodiments, several dowels 207 are arranged in a dowel group 208, and the storage plate 203 includes several such dowel groups 208. In illustrative embodiments, the dowels 207 in each dowel group 208 are arranged in a dowel pattern that mirrors a pattern of dowel reception cavities in a workpiece 180 or a holding apparatus.

In some embodiments, the arrangement of the plate alignment structures (e.g., magnets or metal buttons 204; dowels 207) are configured such that a workpiece 180 may be placed on the alignment structures in only a single way. In other words, in such embodiments, the workpiece 180 will not fit on the alignment fixture in any position except the pre-defined orientation.

For example, in some embodiments, the magnets 204 of a magnet group 205 are arranged to define the three vertexes of an isosceles triangle (not an equilateral triangle), so that the corresponding base magnets on a workpiece 180 or workpiece holder align with the magnets of a magnet group 205 only in one orientation. In some embodiments, at least one magnet of the magnet group 205 is disposed in a direction such that it repels a base magnet on the workpiece 180 or workpiece holder if the workpiece 180 or workholder is not aligned in a pre-determined orientation relative to the magnet group 205. In such embodiments, the pattern defined by the magnet group 205 and the pattern defined by a set of magnets on a workpiece 180 or workholder may be described as being complementary to one another. For example, in an illustrative embodiment, the magnets of the magnet group 205 are disposed in a pattern of + − +, and the magnets on a workpiece 180 or workholder are disposed in a pattern of − + −, so that the patterns align (e.g., each magnet is attracted to its counterpart) only in one orientation of the magnet group 205 to the workpiece 180 or workholder.

As another example, in some embodiments the dowels 207 of a dowel group 208 are arranged to define the three vertexes of an isosceles triangle (not an equilateral triangle), so that the corresponding dowel cavities (or "base" cavities) on a workpiece 180 or a workholder align with the dowels of a dowel group 208 only in one orientation. For example, FIG. 2C schematically illustrates an embodiment of a storage plate 201 in which dowels 207 in each dowel group 208 are arranged in an asymmetrical pattern to define a specific orientation of a workpiece 180 or a workholder.

For example, FIG. 2D schematically illustrates a pattern of alignment structures 209 (which in various embodiments could be metal buttons 204 or dowels 207), which pattern defines the three vertexes of an isosceles triangle. A first leg of the triangle has a length 288 that is not equal to the length 289 of a second leg of the triangle, where neither the first leg nor the second leg is the hypotenuse.

In embodiments in which the alignment structures 209 are dowels 207, a workpiece 180 or a workholder has corresponding dowel cavities arranged in the same triangle so that when dowels 207 engage the dowel cavities, the workpiece 180 or a workholder fits onto the dowel group 198 in only one orientation.

In embodiments in which the alignment structures 209 are metal buttons 204, a workpiece 180 or a workholder may have counterpart securing structure, such as a magnet or non-magnetic metal.

Although the foregoing examples illustrate alignment structures arranged to form the vertexes of an isosceles triangle, embodiments are not limited to that geometric shape. Other embodiments may arrange or configure the alignment structures to form other shapes, as long as those shapes do not permit a workpiece 180, or workholder for holding a workpiece 180, to be coupled to the alignment structures in more than one orientation. Other embodiments arrange the alignment structures to form other triangles or a trapezoid, or a trapezium, to name but a few examples.

Robot 300

Figure 3B:
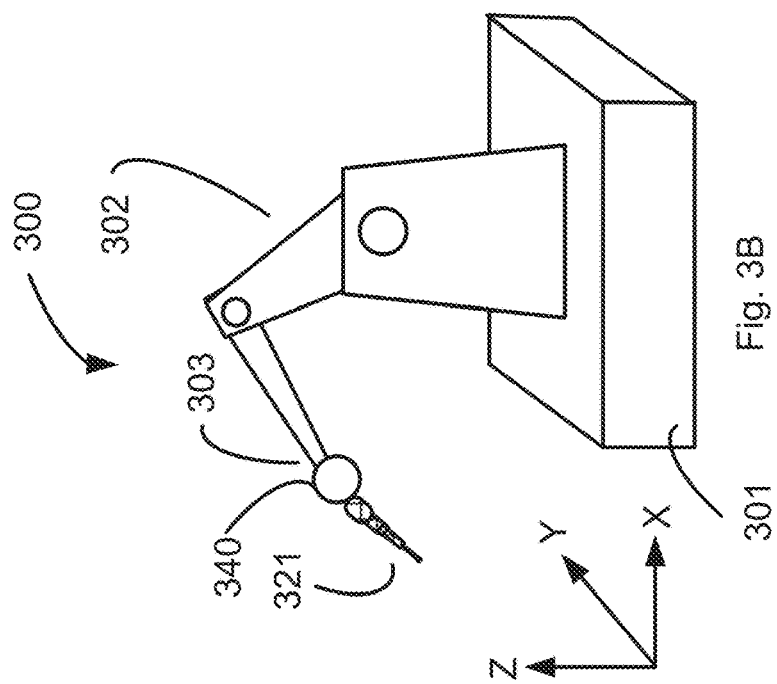
FIG. 3B schematically illustrates an embodiment of a workpiece placement robot.
Figure 3A:
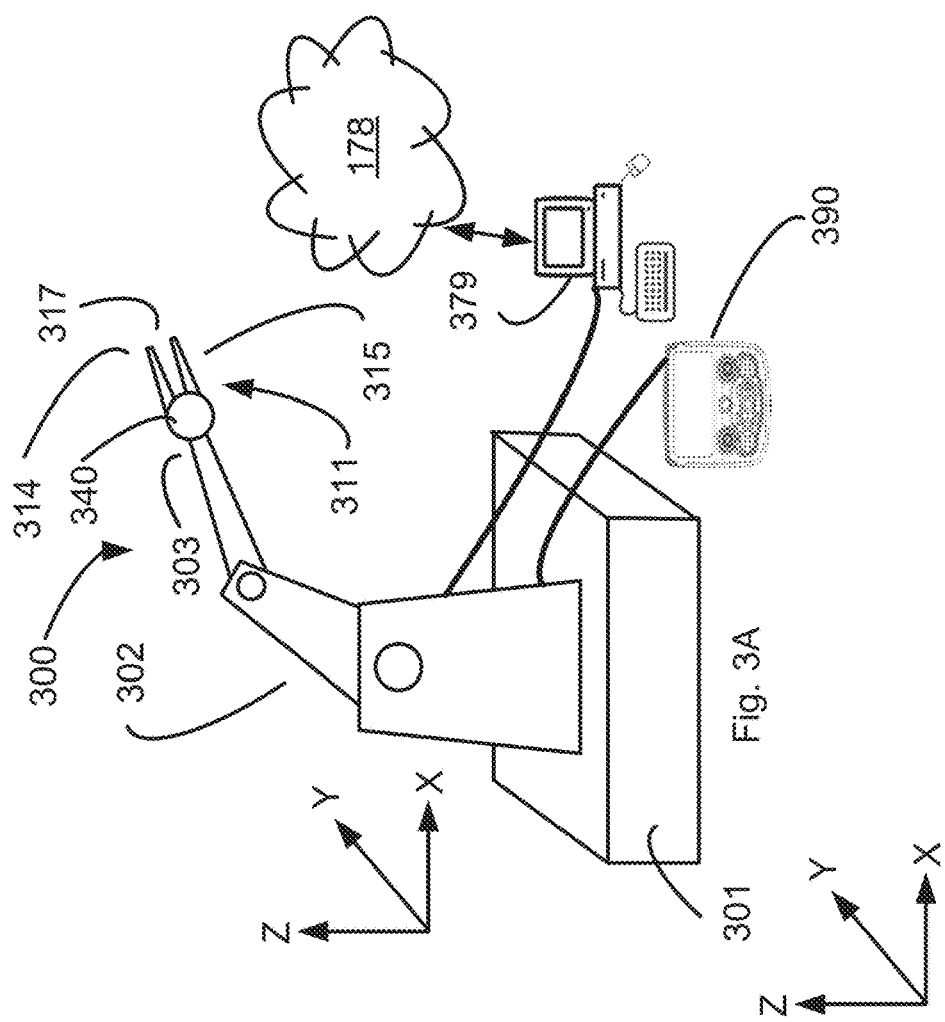
FIG. 3A schematically illustrates an embodiment of a workpiece placement robot.

A robot 300 is schematically illustrated in in FIG. 1A, FIG. 3A and FIG. 3B, and defines a robot coordinate system having three mutually orthogonal axes (X, Y and Z in FIG. 1A). robot coordinate system is independent of the CMM coordinate system (e.g., Q-R-S) and is independent of the storage system coordinate system (e.g., A-B-C axes).

In illustrative embodiments, robot 300 is disposed so that it can reach the drawer or shelf 201 of a storage apparatus 200, and each workpiece 180 of a set of workpieces disposed at the storage apparatus 200, as well as the table 111 of the coordinate measuring machine 100, and a set of workpieces on the storage apparatus 200 and coordinate measuring machine 100. When disposed in that manner, the robot 300 can transport a workpiece 180 from the drawer or shelf 201 to the measuring space 113 of the coordinate measuring machine 100, and can transport a workpiece 180 from the measuring space 113 of the coordinate measuring machine 100 to the drawer or shelf 201. To that end, the robot 300 in this embodiment has a gripper 311 at the end 303 of a movable, articulated arm 302.

In some embodiments, the gripper 311 has two or more fingers 314, 315 separated by a gap 317. The gripper 311 is configured to controllably close and open the fingers 314, 315 to decrease or increase the gap 317 (respectively) so as to grasp and release (respectively) a workpiece 180.

Figure 3D:
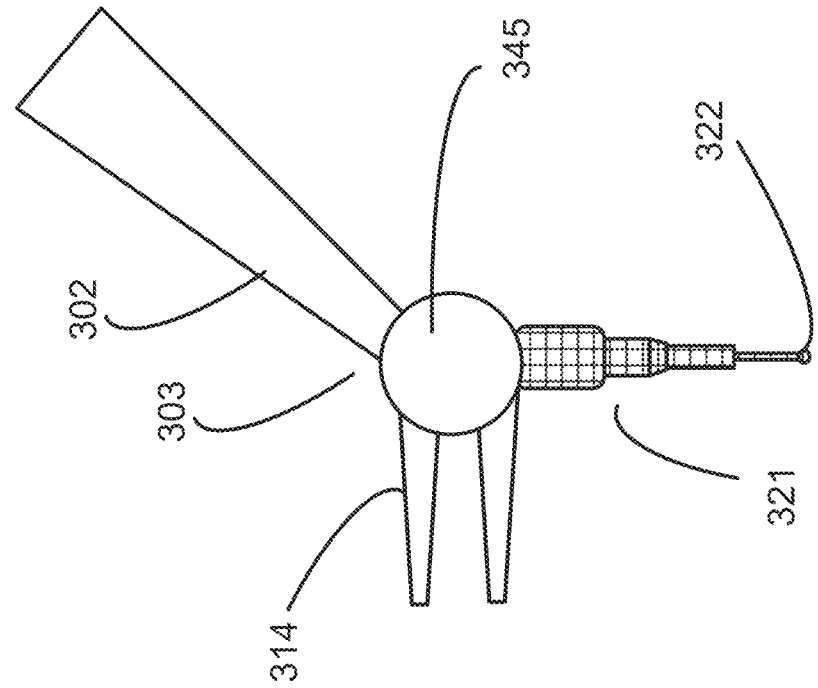
FIG. 3C and FIG. 3D schematically illustrate a carousel in different positions.
Figure 3C:
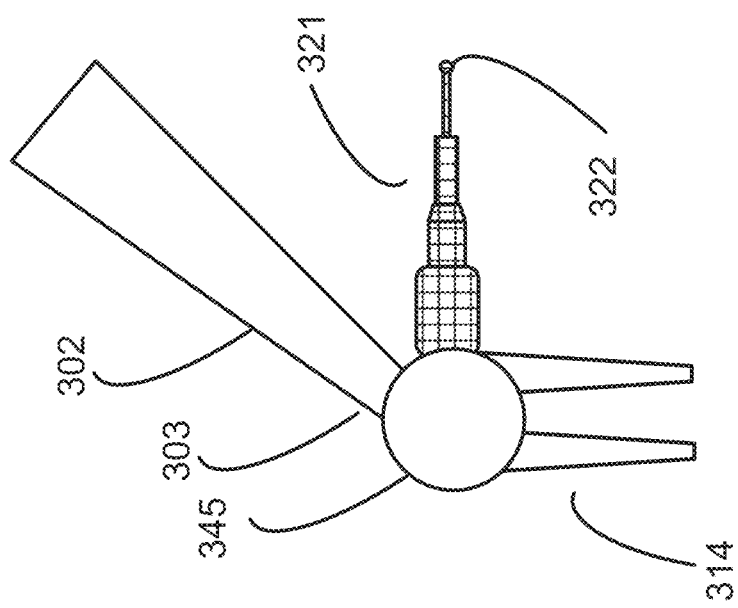

In illustrative embodiments, the robot 300 may be configured with a reference geometry tool 321. For example, the reference geometry tool 321 may be secured to the end 303 of the robot arm 302 (i.e., the end of the arm 302 that is distal from the robot's base 301. In some embodiments, the robot arm 302 may be controllably configured with a gripper 311 and then controllably reconfigured with a reference geometry tool 321. Alternatively, in some embodiments, the robot arm 302 is configured with a reference geometry tool 321 held by and secured in a gripper 311. In yet other embodiments, a robot arm 302 may be configured with a carousel (which may be referred-to as "carousel" 345; FIG. 3C and FIG. 3D), which carousel simultaneously includes both a gripper 311 and a reference geometry tool 321. The carousel 345 is controllably movable such that in a first configuration the gripper 311 is disposed at the end 303 of the arm 302, and in a second configuration the reference geometry tool 321 is disposed at the end 303 of the arm 302.

In illustrative embodiments, the robot 300 (e.g., motion of the robot arm 302 and/or motion of the gripper 311) is controlled by a robot controller. For example, in some embodiments, the robot 300 is controlled by robot control computer 379, or a robot control interface 390. In alternate embodiments, the robot 300 is controlled by the motion controller 153 or the host computer 170 of the coordinate measuring machine 100, which are separate and distinct from the robot control computer 379 and the robot control interface 390.

In illustrative embodiments, the robot arm 302 includes sensors configured to measure the location of the end 303 of the arm 302 relative to the base 301 of the robot 300, each location defined by a corresponding robot arm position datum.

Kinematic Locators

FIG. 4A schematically illustrates a pallet 400 having a set of several kinematic locators 410.

In illustrative embodiments, a kinematic locator 410 includes a cavity 411 configured to seat a shaped tip of a reference geometry tool 321. In some embodiments, the reference geometry tool 321 includes a shaped tip, such as a sphere or "ball" tip. In such embodiments, the robot arm includes such a reference geometry tool 321.

The pallet 400 may be a CMM table 111, or a storage plate 203 of a storage system 200, or other surface on which a workpiece 180 (or several workpieces 180) may individually or simultaneously be stored. For example, in some embodiments the pallet 400 is a plate that is selectively placeable onto, and selectively removable from, the table 111 of a coordinate measuring machine 100, and/or the surface 202 of a storage plate 203.

Moreover, in some embodiments, the kinematic locators 410 are integral to the pallet 400, in that they are fixed in or to the pallet 400 and each kinematic locator 410 maintains a fixed special relationship to each of the other kinematic locators 410. In other embodiments, each kinematic locator 410 of a set of several kinematic locators is moveable with respect to each of the other kinematic locators 410 in the set.

The robot 300 uses the kinematic locators 410 to establish a coordinate system for moving a workpiece 180 (or a plurality of workpieces 180) to and from the CMM table, where each workpiece 180 may be measured by the coordinate measuring machine 100.

Figure 4C:
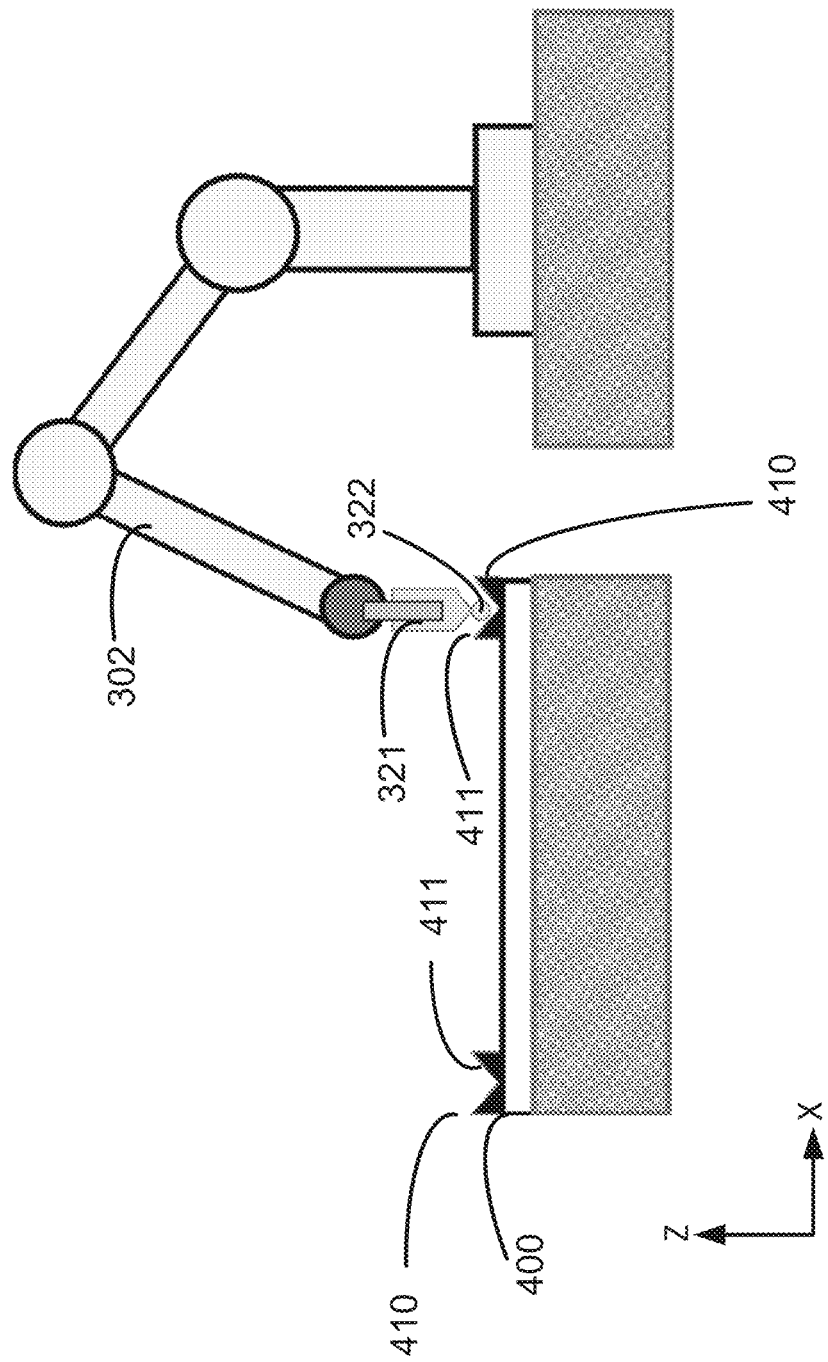

A kinematic locator 410 may be provided in a variety of configurations. For example, in FIG. 4C, each kinematic locator 410 is shown in cross section, and has a concavity 411 (e.g., a cavity having a concave shape) into which a shaped tip 322 of a reference geometry tool 321 fits. In preferred embodiments, the concavity 411 has a shape that is complementary to the shape of a corresponding shaped tip 322 of a reference geometry tool 321, such that when the corresponding shaped tip 322 of a reference geometry tool 321 is placed within the concavity 411, the corresponding shaped tip 322 of a reference geometry tool 321 is kinematically constrained. For example, when the shaped tip 322 of a reference geometry tool 321 is a ball or sphere, it will be kinematically constrained within a concavity 411 having three tetrahedron geometric surfaces, as shown in FIG. 4A for example, because the surface of the ball makes kinematic contact at three (and in this example only three) points within the concavity 411.

In other illustrative embodiments, the concavity 411 has other shapes. For example, in FIG. 4B the concavity 411 has the shape of a cone, or the shape of a hemisphere, to name but a few examples.

In other illustrative embodiments, the kinematic locator 410 may have a shaped geometry, and the reference geometry tool 310 may have a cavity having a shape that is complementary to the shaped geometry of the kinematic locator 410. In such embodiments, the shaped geometry of the kinematic locator 410 may be disposed in (or at least partially within) the cavity of the reference geometry tool 321 such that the shaped geometry of the kinematic locator 410 kinematically seats in or to the cavity in the reference geometry tool 321, such that the reference geometry tool 321 is kinematically constrained.

In some embodiments, each kinematic locator 410 is an item that is distinct from the coordinate measuring machine 100 in that the kinematic locator 410 may be individually placed-onto and removed-from the table 111 of the coordinate measuring machine 100. Once placed on the table 111 of the coordinate measuring machine 100, the set of kinematic locators 410 define a coordinate system relative to the table 111 of the coordinate measuring machine 100. To that end, in preferred embodiments, a set of kinematic locators 410 placed on the table 100 of a coordinate measuring machine 100 includes at least three kinematic locators 410. In preferred embodiments, the kinematic locators 410 of the set of kinematic locators are disposed at the periphery of the measuring envelope 113 of the coordinate measuring machine 100.

In other embodiments, a set of two or more kinematic locators 410 are integrated into a single unit (e.g., kinematic locator pallet 400 in FIG. 4C), such that the entire kinematic locator pallet 400 may be placed-onto and removed-from the table 111 of the coordinate measuring machine 100. Such embodiments provide the additional benefit that they are configured such that each kinematic locator 410 maintains a fixed geometric relationship to the each of kinematic locator 410 of the pallet 400.

Figure 4D:
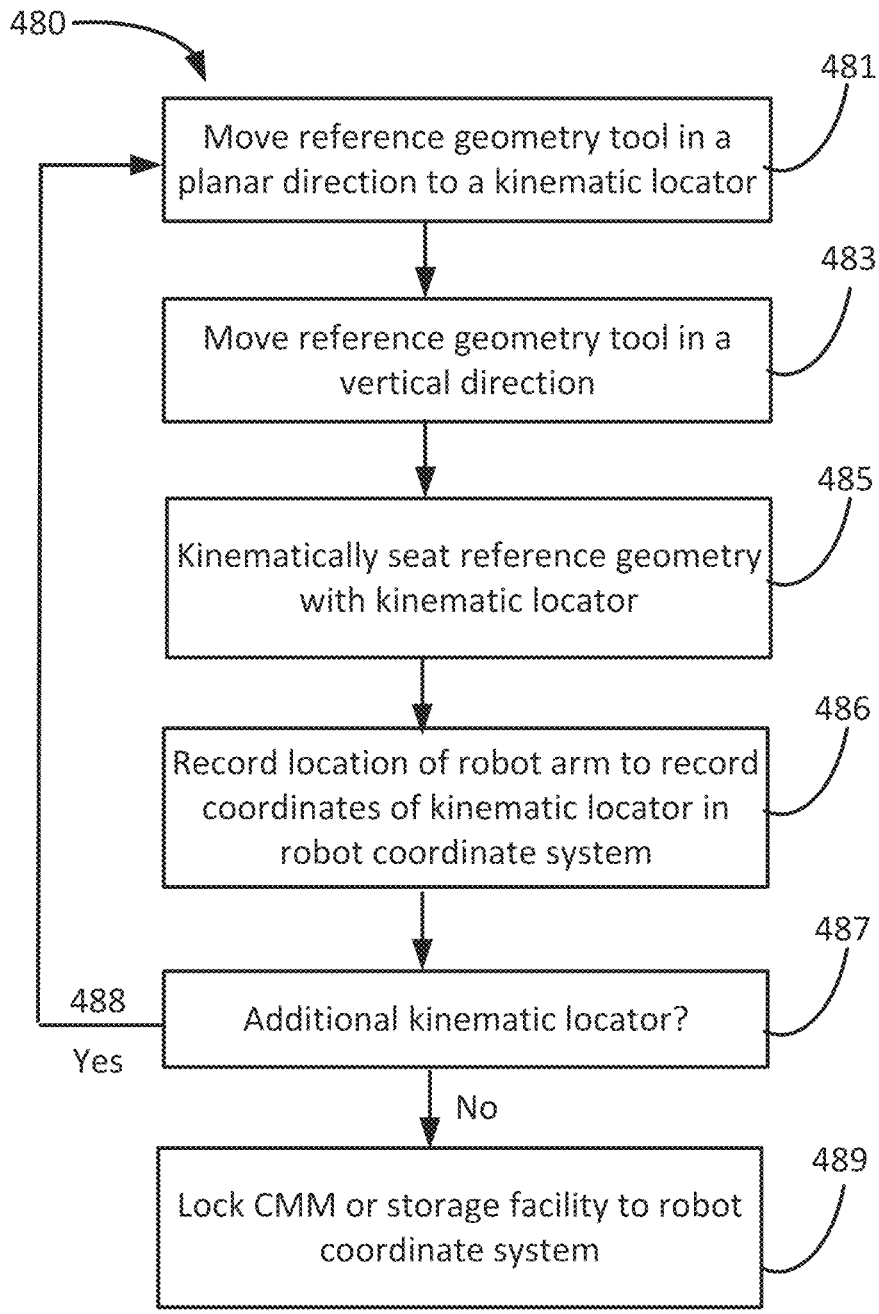
FIG. 4D is a flowchart illustrating a method 480 of locating a kinematic locator using a referenced geometry tool.

FIG. 4D is a flowchart illustrating a method 480 of locating a kinematic locator 410 with a reference geometry tool 321. This method may be used to locate a set of kinematic locators 410 on a coordinate measuring machine 100, and/or a set of kinematic locators 410 on a storage apparatus 200. The following example expresses directions in terms of the robot coordinate system (i.e., X-Y-Z axes).

Step 481 includes moving the reference geometry tool 321 in a planar direction (in the X and/or Y direction) until the reference geometry tool 321 is aligned with a kinematic locator 410. Moving the reference geometry tool 321 may be performed manually by an operator using a robot control interface 390, or by an operator manually manipulating the robot arm 302 by hand, or by a programmed robot control computer 379.

Step 483 includes moving the reference geometry tool 321 in a vertical (e.g., Z-axis) direction until the reference geometry tool 321 is kinematically seated with the kinematic locator 41 Step 485 kinematically seats the reference geometry tool with the kinematic locator;

Step 486 records the location of the robot arm in the robot coordinate system when the reference geometry tool 321 is kinematically seated with the kinematic locator 410. In some embodiments, the operator records the location of the robot by hitting the "Enter" or "Done" key, for example on a robot control interface 390, or by a programmed robot control computer 379, so that the robot's software saves the coordinates of the workpiece setup relative to the robot's coordinate system.

In some embodiments, the act of locating a storage datum marker and/or locating a CMM datum marker (e.g., steps 481-486) is done by an operator manually moving the reference geometry tool to kinematically seat into the storage datum marker and/or into the CMM datum marker, for example by manually manipulating a robotic arm or the reference geometry tool, or by using a manual user interface on a coordinate measuring machine. In preferred embodiments, steps 481-486 are repeated three times on each of three different kinematic locators on each apparatus to create a fully restrained reference system for that apparatus.

In some embodiments, such as where a robot using a reference geometry tool already has a previously-established orientation to a storage apparatus and/or a coordinate measuring machine, an act of re-locating a storage datum marker and/or locating a CMM datum marker follows steps 481-486, and may be performed automatically by the robot using a kinematic device and force sensing, for example to update or fine-tune the respective previously-established orientation. In such embodiments, the reference geometry tool 321 may be a kinematic sensor that produces a signal when it is seated or kinematically constrained within a kinematic locator. In such an embodiment, the robot automatically moves the reference geometry tool 321 according to steps 481 and 482, and seats the reference geometry tool 321 into the kinematic locator according to step 485, thereby causing the kinematic locator 321 to produce the kinematic sensor signal. The programmed robot control computer 379 receives the kinematic sensor signal and knows that the reference geometry tool 321 is kinematically seated within the kinematic locator, and stops the motion of the robot, and records the location of the robot arm according to step 486, and in illustrative embodiments proceeds to step 487 and step 489. Step 487 determines whether there is at least one additional kinematic locator 410 that has not been located, and if so the method loops, at step 488, back to step 481 and repeats steps 483-487. Otherwise, the method proceeds to step 489, at which the method locks the CMM 100 and/or the storage apparatus 200 to the robot coordinate system by associating the coordinates of the kinematic locators 410 to the robot's coordinate system. In this way, a set of points on the CMM 100 and a set of points on the storage apparatus 200 can be found by the robot 200. In embodiments in which the robot re-locates kinematic locators, when all, or at least a sub-set, of kinematic locators have been re-located, the method updates the lock of the CMM 100 and/or storage facility 200 to the robot coordinate system at step 489.

It should be noted that, in preferred embodiments, the set of datum markers includes at least three datum markers (e.g., kinematic locators and/or optical locators) for each apparatus. For example, in such embodiments a workpiece measuring machine will have at least three WMM datum markers, and a storage apparatus will have at least three storage datum markers. When a robot has located at least three datum markers, the location of the apparatus may be considered to be constrained in six degrees of freedom.

Illuminator Head

In alternate embodiments, the arm 302 of the robot 300 includes and employs an illuminator head 500, as schematically illustrated in FIG. 5A, FIG. 5B, FIG. 5C, FIG. 5D, FIG. 5E, FIG. 5F, FIG. 5G, and FIG. 5H. The illuminator head 500 may be considered to be an optical embodiment of a reference geometry tool 321, and is configured to determine the coordinates of an optical locator 550, which may be considered to be an optical counterpart to a kinematic locator.

The illuminator head 500 includes a housing 510 having a set of at least two light emitters 521, 531. The first light emitter 521 is configured to produce a first beam of light 522, and second light emitter 531 is configured to produce a second beam of light 532 at an angle 533 relative to the first beam of light 522 such that the first beam of light 522 intersects the second beam of light 532 at a pre-determined distance 541 from the illuminator head 500. In illustrative embodiments, each of the light emitters 521, 531 is a laser diode. In illustrative embodiments, the light beams 522 and 523 are visible light, in that they are visible to a healthy, un-aided human eye. In other words, the light emitters 521, 531 emit, respectively, two light beams 522, 523 that intersect one another at pre-determined distance 541 from the illuminator head.

Figures 5A, 5B:
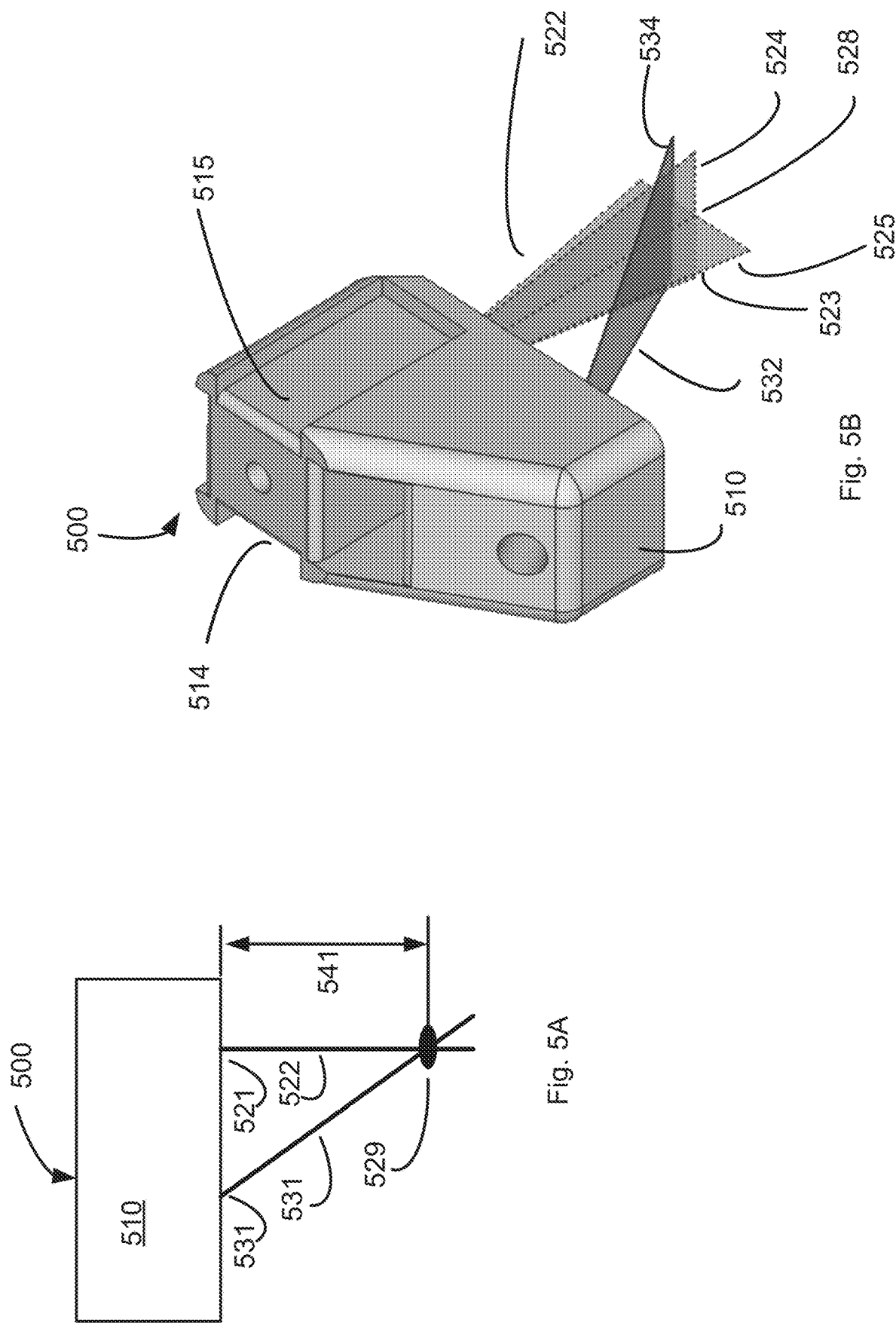
FIG. 5A, FIG. 5B, FIG. 5C and FIG. 5D schematically illustrate embodiments of a n illuminator head.
Figure 5D:
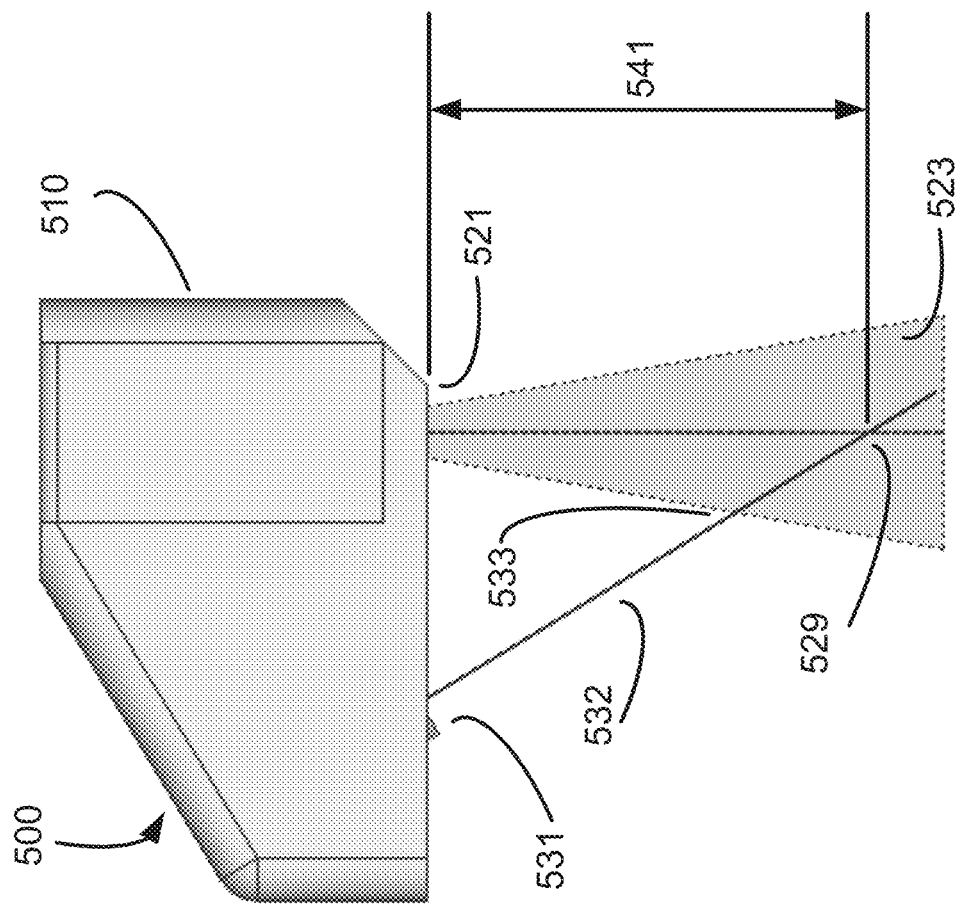
Figure 5C:
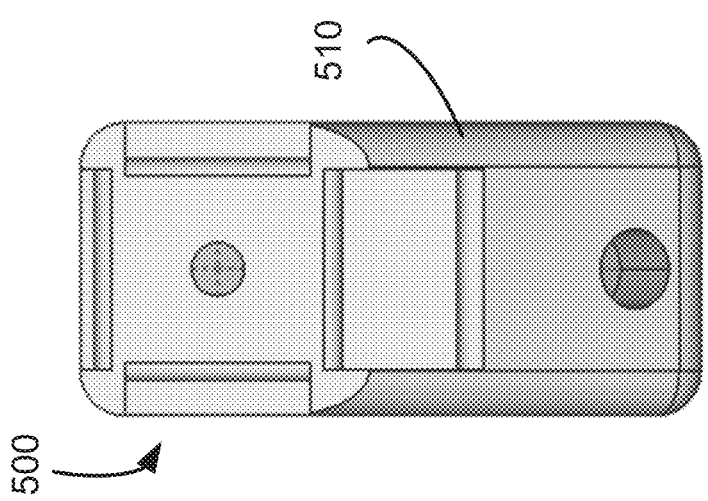

In some embodiments, as schematically illustrated in FIG. 5A, the first beam of light 522 is a collimated beam, or "pencil" and the second beam of light 532 is a collimated beam, or "pencil" beam.

In other embodiments, at least one of the light emitters 521, 531 is configured to emit a fan beam of light. In one such embodiment, as schematically illustrated in FIG. 5B, the first beam of light 522 is a first fan beam of light, and the second beam of light 532 is a second fan beam of light. For example, in embodiments in which each of the light emitters 521, 531 is a laser diode, each fan beam of light is a fan beam of visible laser light.

When a fan beam of light crosses a reference plane normal to its direction of propagation, the fan beam forms a line in that plane. For example, in FIG. 5B, the first light emitter 521 is configured such that it would produce, when crossing such a reference plane, a first line 524, and the second light emitter 531 is configured such that it would produce, when crossing that reference plane, a second line 534, wherein the second line 534 crosses the first line 524.

In illustrative embodiments, the first beam of light 522 includes a third fan beam of light 523, the third fan beam of light 523 configured to cross the first fan beam of light 522, and the first fan beam 522 and third fan beam 523 are configured such that they would produce, when crossing the reference plane, a plus ("+") or "X" pattern 525. The plus or X pattern 525 includes a point (or "crossing point" or "coincident point") 528 at its center, at the point where its two fan beams 522 and 523 intersect.

As so configured, when the illuminator head 500 is disposed a predetermined 541 above a flat surface, the second fan beam insects the crossing point 528 at the point 529. In other words, the three fan beams 522, 523 and 532 mutually intersect at point 529, which is a predetermined distance 541 from the illuminator head.

Figure 5E:
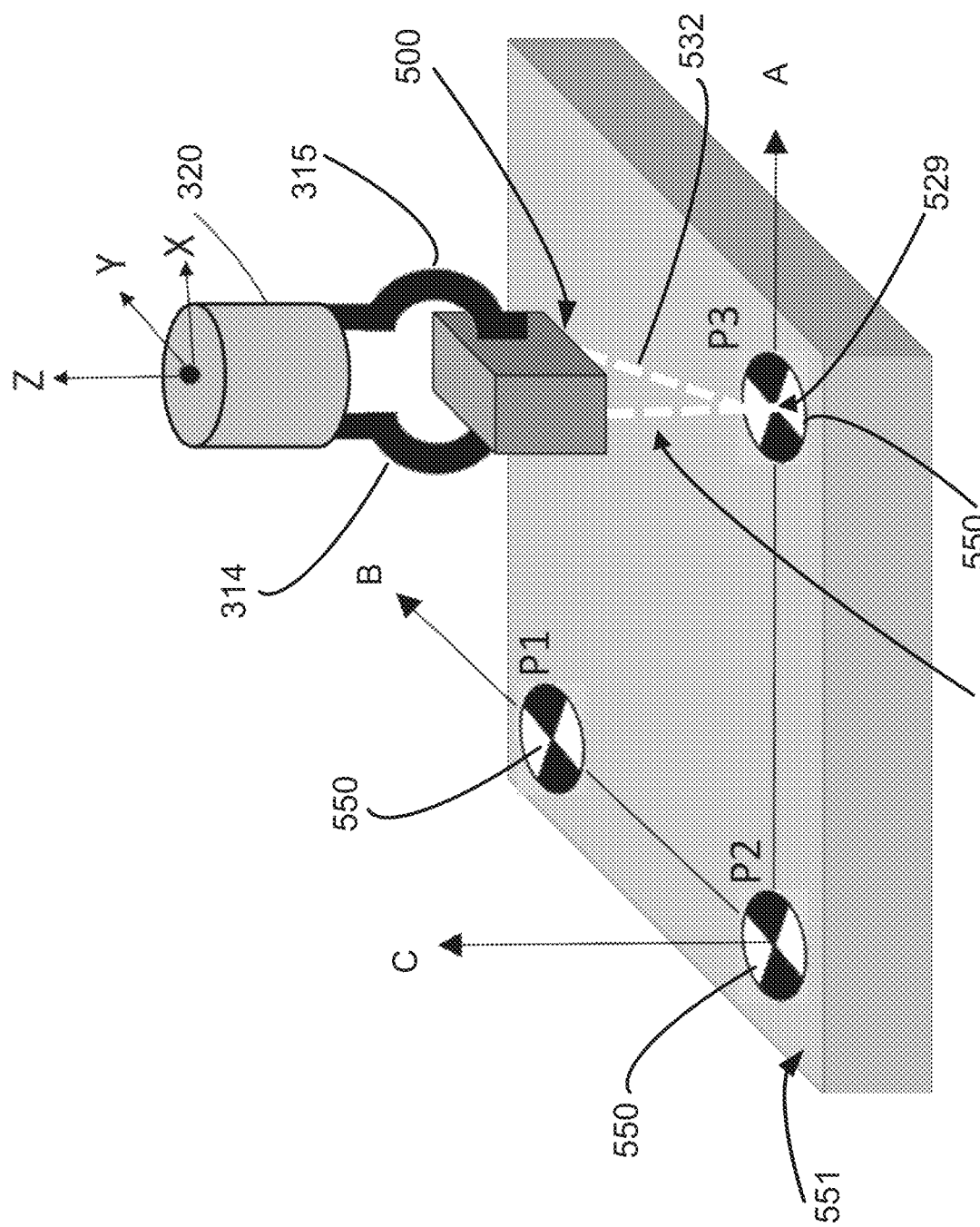

In some embodiments, the illuminator head 500 may be configured to be grasped and held by an end effector, as illustrated in FIG. 5E, to show but one example. To that end, some embodiments of the illuminator head 500 have features that correspond to, and that are configured to interface with, grippers 311 (e.g., gripper fingers 314, 315) on an end effector. In FIG. 5B for example, the illuminator head 500 has a plurality of gripper slots 514, 515, each gripper slot 514, 515, shaped (e.g., configured) to receive a gripper finger 314, 315 from a gripper 311. When a finger (e.g., 314) of a gripper 311 is received by a gripper slot (e.g., 514), the gripper finger 314 firmly seats in the gripper slot 514, and in some embodiments is kinematically constrained by the gripper slot 514, so as to securely hold the illuminator head 500 stationary with respect to the robot arm 302. In preferred embodiments, each gripper slot 514, 515 is shaped or configured such that the illuminator head 500 is held a fixed distance from the end 303 of the robot arm 302, to facilitate fidelity of measurements of points within the robot coordinate system.

To that end, in illustrative embodiments, each gripper slot 514 is disposed opposite another gripper slot 515, such that the gripper slots 514, 515 are configured so that a robot griper 311 can squeeze the illuminator head between its fingers 314 and 315 by placing a gripper finger 314, 315 into a corresponding one of the gripper slots 514, 515, so as to hold the illuminator head 500 securely. Consequently, in operation, an illuminator head 500 may be grasped, held and manipulated by a robot arm 302.

The illuminator head 500 is used in some embodiments to create reference systems for systems to be accessed by a robot 300, such as a workpiece storage apparatus 200, and/or a coordinate measuring machine 100. It allows the user to set visual target points (e.g., optical locators 550) on different storage apparatus 200, and/or a coordinate measuring machine 100. Such visual target points can be located (e.g., by an illuminator head 500) without making physical contact with them. An operator, or a programmed controller, can position the robot 300 using projected target points visible on a workpiece storage apparatus 200 and/or a coordinate measuring machine 100 at precise datum locations. By setting the visual target at each datum and recording the robot's position, coordinates at those datum locations, the robot 300 can be used to build a coordinate system common to the robot and the workpiece storage apparatus 200 and/or a coordinate measuring machine 100. The robot can then use that coordinate system as a reference for its automated movements to pick and place workpieces.

In operation, an operator may dispose the illuminator head 500 above a surface such that the light beams from the light emitters 521 and 531 impinge on the surface 551 (see, e.g., FIG. 5E). For example, the surface 551 may be the surface of the table 111 of a CMM 100, or the surface of a workpiece 180 or a pallet 400. In other embodiments, the surface may the surface of a storage facility 200 as schematically illustrated in FIG. 5F, r a workpiece 180, as schematically illustrated in FIG. 5G and described in more detail below. The operator may adjust the distance of the illuminator head 500 from the surface until the light beams visibly intersect as described above to form visible spot 529, at which point the illuminator head 500 is at the given distance 541 above the surface. The operator may adjust the location of the visible spot 529 until the visible spot 529 illuminates an optical locator 550, as schematically illustrated at point "P3" in FIG. 5E, for example, at which point the illuminator head 500 is at a specific planar location within the coordinate system of the surface (illustrated with coordinate system A-B-C in FIG. 5E). The operator then records the coordinates (in the X-Y-Z coordinate system of the robot 300) of the position of the illuminator head 500, and repeats the process for any remaining optical locators 550 (e.g., point "P2" and point "P3" in FIG. 5E). Upon completion of that procedure, the coordinate system of the robot 300 may be described as being "locked" to the coordinate system of the surface 551.

Figure 5H:
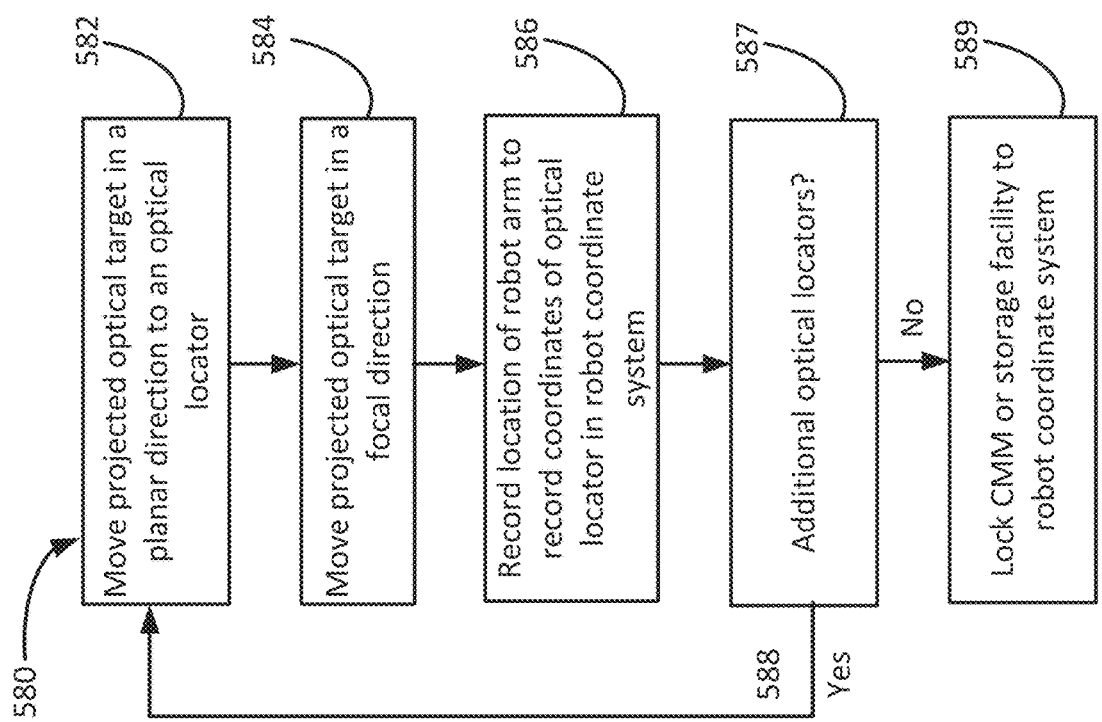
FIG. 5H is a flowchart illustrating a method locating an optical locator using an illuminator head.

FIG. 5H is a flowchart illustrating a method 580 of operation of an illuminator head 500. This method may be used to locate a set of optical locators 550 on a coordinate measuring machine 100, and/or a set of optical locators 550 on a storage apparatus 200. The following example expresses directions in terms of the robot coordinate system (i.e., X-Y-Z axes).

Step 582 includes moving the illuminator head 500 in a planar direction (in the X and/or Y direction) until the illuminator head 500 illuminates an optical locator 550. Moving the illuminator head 500 may be performed manually by an operator using a robot control interface 390, or by a programmed robot control computer 379.

Step 584 includes moving the illuminator head 500 in a focal direction (in this embodiment of FIG. 5E, for example, in the Z-axis) until the illuminator head 500 is a fixed distance above the optical locator 550. The illuminator head 500 is a fixed distance above the optical locator 550 when crossing point 529 is on the optical locator 550.

Step 586 records the location of the robot arm in the robot coordinate system when the illuminator head 500 simultaneously illuminates an optical locator 550 and the illuminator head 500 is a fixed distance above the optical locator 550. In some embodiments, the operator records the location of the robot by hitting the "Enter" or "Done" key, for example on a robot control interface 390, or by a programmed robot control computer 379, so that the robot's software saves the coordinates of the workpiece setup relative to the robot's coordinate system.

At step 587, the method then determines whether there is at least one additional optical locator 550 to be located, and if so the method loops, at step 588, back to step 582 and repeats steps 582-587. In preferred embodiments, steps 582-586 are repeated three times on each of three different optical locators on each apparatus to create a fully restrained reference system for that apparatus. Otherwise, the method proceeds to step 589, at which the method locks the coordinate measuring machine 100 or storage apparatus 200 to the robot coordinate system. In illustrative embodiments, the robot coordinates recorded for each such optical locators 550 are used to create a new coordinate system for the workpiece storage apparatus 200. Consequently, the storage system coordinate system (axes A-B-C) may be described as being "locked" to the robot's coordinate system (axes X-Y-Z) in that a point expressed in the storage system coordinate system (i.e., points expressed in A, B, C coordinates) maybe located by the robot arm operating in the robot coordinate system (axes X, Y, Z). In illustrative embodiments, at least three datum points are preferred to fully lock the storage system coordinate system to the robot's coordinate system.

System Operation

Figure 6:
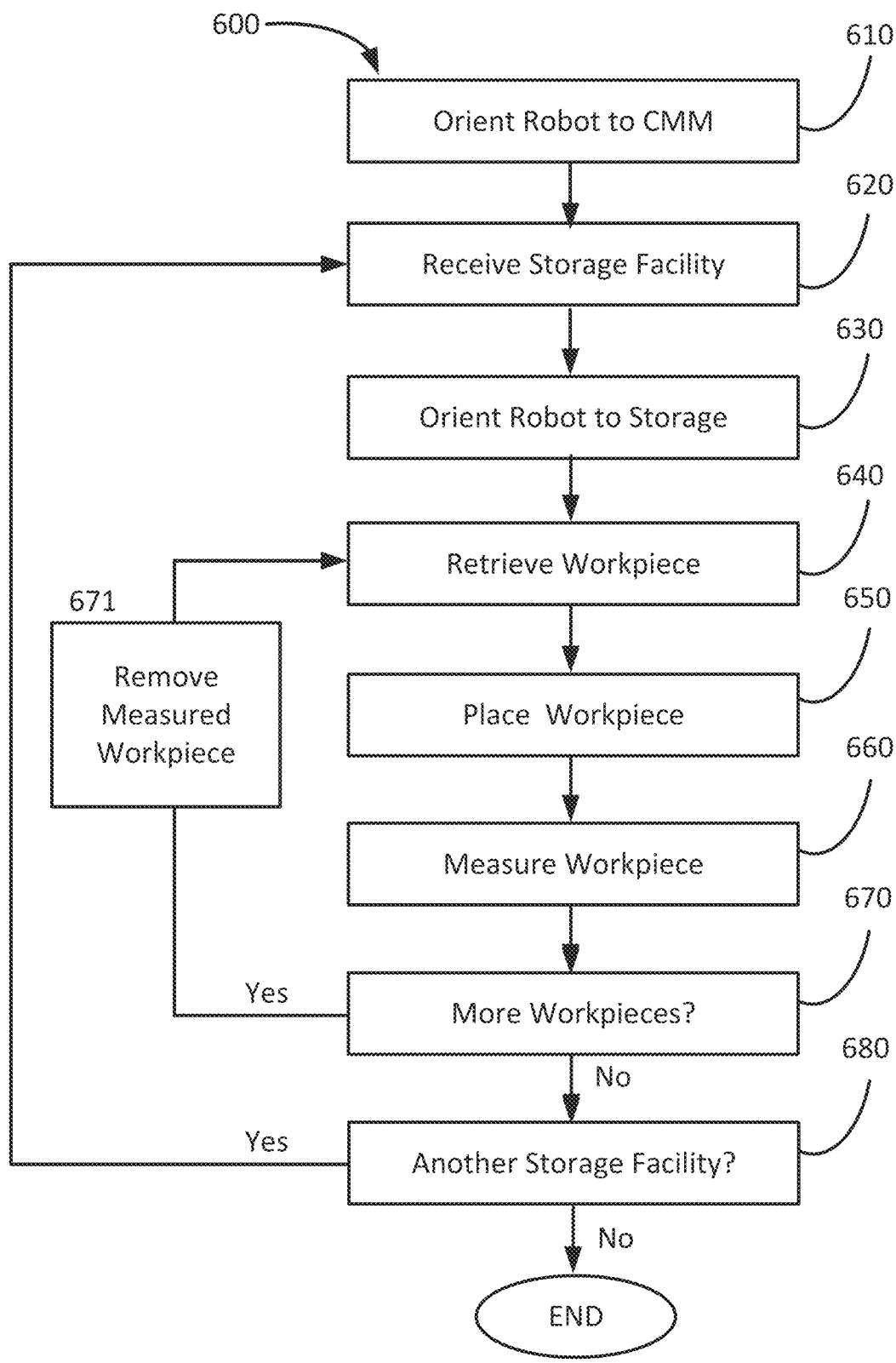
FIG. 6 is a flowchart illustrating an embodiment of operation of a CMM system.

FIG. 6 is a flowchart that illustrates an embodiment of a method 600 of operating a measurement system having a coordinate measuring machine 100, a workpiece storage apparatus 200, and a workpiece handling robot 300.

The method the includes defining a coordinate system common to a measuring space of the coordinate measuring machine 100, the workpiece storage apparatus 200, and the workpiece handling robot 300. In illustrative embodiments, defining the coordinate system includes (a) orienting the robot to the CMM 100 (step 610), and (b) orienting the robot to the workpiece storage apparatus (step 630).

If no workpiece storage apparatus 200 having workpieces 180 to be measured is present, then the method includes, at step 620, receiving a storage apparatus 200. For example, a workpiece storage apparatus 200 having unmeasured workpieces 180 may be moved into the vicinity of the robot 300. The workpiece storage apparatus 200 may replace a previous apparatus 200, the workpieces of which have already been measured. To that end, a workpiece storage apparatus 200 may be an automatic guided vehicle (or "AGV"), may be on wheels, or may be on a pallet that is moved into the vicinity of the robot 300.

In illustrative embodiments, the workpieces 180 of each workpiece storage apparatus 200 are disposed on the workpiece storage apparatus 200 in a predetermined location relative to the workpiece storage apparatus 200. In this way, a robot can, once the robot 300 is oriented to the workpiece storage apparatus 200, be deemed to have knowledge of the location of each workpiece 180 on the workpiece storage apparatus 200. With that knowledge, the robot 300 can accurately and automatically retrieve and or deliver (or "pick" and "place") any workpiece 180 from and to the workpiece storage apparatus 200.

In illustrative embodiments, orienting the robot to the measuring space 113 of the coordinate measuring machine 100 (step 610) includes manually operating the robot 300 to locate each of a plurality of CMM kinematic locators 410 (and/or CMM optical locators 550) on the coordinate measuring machine 100, and orienting the robot to the workpiece storage apparatus 200 (step 630) includes manually operating the robot 300 to locate each of a plurality of storage kinematic locators (or and/or storage optical locators 550) on the workpiece storage apparatus 200.

Subsequently, step 640 includes controlling the robot 300 to automatically retrieve a first workpiece 180 from the workpiece storage system 200.

Next, step 650 includes controlling the robot 300 to automatically place the first workpiece 180 into the measurement envelope 113 of the coordinate measuring machine 100, such that the first workpiece 180 is disposed so that the coordinate measuring machine 100 can measure the first workpiece 180.

At step 660, the method 600 includes measuring the first workpiece 180, in ways known in the coordinate measuring machine arts.

Some embodiments determine, at step 670, whether there is an additional workpiece 180 (i.e., in addition to the first workpiece 180) to be measured by the coordinate measuring machine 100. If so, step 671 removes the first workpiece 180 (which may at this point be referred-to as the first "measured" workpiece) from the coordinate measuring machine 100, and the method 600 loops back to step 640 at which the method retrieves a subsequent workpiece (e.g., a "second" workpiece) from the workpiece storage system 200, and places the subsequent work piece 180 into the measurement volume of the coordinate measuring machine 100. Some embodiments then place the first workpiece 180 back into the storage apparatus 200, and some embodiments place the first workpiece 180 back to its original position on the workpiece storage apparatus 200. Alternative embodiments place the first workpiece 180 in a location other than its original position on the workpiece storage apparatus 200, such as at a different location on the workpiece storage apparatus 200, or a location not on the workpiece storage apparatus 200, such as on a "measured workpiece" apparatus. To that end, some embodiments place the first workpiece in a location specified for measured workpieces that passed inspection (e.g., workpieces that have been measured by the CMM 100 and met required specifications) or a location specified for measured workpieces that did not pass inspection. In illustrative embodiments, the method loops through steps 640-650-660-670 until each workpiece 180 has been measured.

Some embodiments then determine, at step 680, whether there is another storage apparatus 200 having workpieces 180 to be measured by the CMM 100. If not, the method 600 terminates. Otherwise, the method 600 loops back to step 620 to receive said storage apparatus 200, and then proceeds to step 630 to orient the robot 300 to said storage apparatus 200. Subsequently, the process loops through steps 640-650-660-670 until each workpiece 180 on said storage apparatus 200 has been measured, and then to step 680.

Pursuant to the foregoing descriptions, a system including a coordinate measuring machine, a workpiece storage apparatus, and a robotic arm is configured for manipulating a set of workpieces for measurement by the coordinate measuring machine. The system includes a robotic arm configurable into an orientation configuration and a placement configuration, wherein: in the orientation configuration, the robotic arm deploys a reference geometry tool, and wherein in the placement configuration, the robotic arm deploys a gripper.

The system also includes a controller operably coupled to the robotic arm. The controller is configured to receive, from the robotic arm in the orientation configuration, measuring space coordinates of each of a set of CMM datum markers on the coordinate measuring machine, and to define, based on those coordinates, a measuring space on the coordinate measuring machine; and subsequently to operate the robotic arm in the placement configuration to retrieve sequentially, from a storage space, each workpiece in the set of workpieces, and to place each such workpiece into the measuring space of the coordinate measuring machine. In some embodiments, an operator manually moves the reference geometry tool to locate each CMM datum marker of the set of CMM data markers. For example, the operator may manually manipulate the robotic arm to move the reference geometry tool. In some embodiments, the operator manipulates the robotic arm using a jogbox or other interface, to move the reference geometry tool.

The controller is configured to receive, from the robotic arm in the orientation configuration, storage space coordinates of each of a set of storage datum markers on the storage apparatus and to define, based on those storage space coordinates, the storage space.

In some embodiments, each CMM datum marker of the set of CMM datum markers includes a CMM kinematic locator having a kinematic cavity, and the reference geometry tool includes a tip having a tip geometry that fits precisely into the kinetic cavity for determining precise coordinate positions with respect to a robot reference system. The kinematic locators are, in some embodiments, affixed to a CMM or pallet other storage apparatus used to enable the transfer of workpieces to and from the CMM using the robot. In some embodiments, the tip geometry includes a sphere.

In alternative embodiments, the reference geometry tool includes a kinematic cavity, and each CMM datum marker of the set of CMM datum marker includes a kinematic locator having a convex surface, the kinematic cavity configured to engage the convex surface of the CMM kinematic locator such that the convex surface is kinematically constrained within the kinematic cavity.

In some embodiments, the reference geometry tool is permanently affixed at a designated position at the end of the robot arm or its end effector. In alternative embodiments, the reference geometry tool is removably coupled to a designated position at the end of the robot arm or its end effector. In yet other embodiments, the robotic arm simultaneously includes both the gripper and the reference geometry tool, and in the orientation configuration, the robotic arm deploys the reference geometry tool at a distal end of the arm; and in the placement configuration, the gripper the robotic arm deploys the gripper at the distal end of the arm. For example, in some embodiments the robotic arm includes a carousel, and both the gripper and the reference geometry tool are simultaneously disposed on the carousel, and the controller is configured to in the orientation configuration, configure the carousel such that the reference geometry tool is disposed at the distal end of the arm; and in the placement configuration, configure the carousel such that the gripper is disposed at the distal end of the arm.

In some embodiments, the reference geometry tool includes an illuminator head that includes a first source of visible light configured to project a visible X pattern at a first angle relative to the robotic arm, the X pattern defining a coincident point; and a second source of visible light configured to project a visible line at a second angle relative to the robotic arm. In such embodiments, the second angle is different from the first angle, such that the visible line intersects the coincident point at a known distance from the illuminator head.

Another embodiment of a system for measuring a set of workpieces includes a coordinate measuring machine 100, a workpiece storage apparatus 200 configured to store a set of workpieces, and a workpiece placement robot 300 disposed within reach of both a measuring space of the coordinate measuring machine 100 and the workpiece storage apparatus 200. The system also includes a controller (e.g., 379, 390, or 150) in control communication with the coordinate measuring machine 200 and the workpiece placement robot 300. By virtue of its programming, the controller configured to: respond to operator control to operate the workpiece placement robot 300 to establish a common reference coordinate system among the coordinate measuring machine 100, the workpiece storage apparatus 200, and the workpiece placement robot 300 and, after establishing the common reference coordinate system, to automatically locate a plurality of workpieces 180 at the workpiece storage apparatus 200, and sequentially, for each of the plurality of workpieces 180, operate the placement robot 300 to move the workpiece 180 to the coordinate measuring machine 100, and to operate the coordinate measuring machine 100 to measure the workpiece 180. In some such systems, the controller is further configured to operate the placement robot 300 to automatically return the workpiece 180 to the workpiece storage apparatus 200.

The foregoing description also teaches a computer-implemented method of operating a measurement system having a coordinate measuring machine 100 including a measuring volume, a workpiece storage apparatus 200, and a workpiece handling robot 300 having a robot coordinate system. The method includes defining a coordinate system common to a measuring space of the coordinate measuring machine 100, the workpiece storage apparatus 200, and the workpiece handling robot 200. In illustrative embodiments, that common coordinate system is the coordinate system of the robot 300.

In illustrative embodiments, defining the coordinate system includes orienting the robot 300 to the measuring space of the coordinate measuring machine 100 and orienting the robot 300 to the workpiece storage apparatus 200. Orienting the robot to the measuring space of the coordinate measuring machine 100 includes, for each CMM datum marker in a set of CMM datum markers on the coordinate measuring machine, locating the CMM datum marker in the robot coordinate system, and recording the location of the CMM datum marker in a computer memory.

Moreover, orienting the robot 300 to the workpiece storage apparatus 200 includes, for each storage datum marker in a set of storage datum markers, locating the storage datum marker in the robot coordinate system, and recording the location of the storage datum marker in the computer memory.

Locating each of the plurality of storage datum marker on the workpiece storage apparatus 200 and locating each of the plurality of CMM datum marker on the coordinate measuring machine 100 defines the coordinate system common to a measuring space of the coordinate measuring machine 100, the workpiece storage apparatus 200, and the workpiece handling robot 300. That common coordinate system enables the robot 300 to accurately and automatically retrieve a workpiece 180 from the workpiece storage apparatus 200 and accurately and automatically place that workpiece 180 onto a measuring volume of the coordinate measuring machine 100.

In illustrative embodiments, the method further includes automatically retrieving a first workpiece 180 from the workpiece storage apparatus 200, and automatically placing the first workpiece 180 onto the measuring volume of the coordinate measuring machine 100, and subsequently automatically measuring the first workpiece 180 with the coordinate measuring machine 100.

In some embodiments, the method further includes, prior to orienting the robot 300 to the workpiece storage apparatus 200 and prior to orienting the robot 300 to the measuring space of the coordinate measuring machine 100, configuring the robot 300 into an orientation configuration, in which the robot includes a reference geometry tool; and locating each of a plurality of storage datum markers on the workpiece storage apparatus 200 includes locating each of the plurality of storage datum marker on the workpiece storage apparatus 200 with the reference geometry tool. Further, locating each of the plurality of CMM datum markers on the coordinate measuring machine 100 includes locating each of a plurality of CMM kinematic locators on the coordinate measuring machine 100 with the same reference geometry tool.

In some such embodiments, each of the plurality of storage datum markers on the workpiece storage apparatus 200 is a storage kinematic locator, and each of the plurality of CMM datum markers on the coordinate measuring machine 100 is CMM kinematic locator. In such embodiments, locating each of the plurality of storage datum markers (i.e., the storage kinematic locators) on the workpiece storage apparatus 200 includes manually controlling the robot 300 to seat a shaped tip 322 of the reference geometry tool 321 into each of the plurality of storage kinematic locators such that the shaped tip 322 is kinematically constrained with each such storage kinematic locator; and locating each of the plurality of CMM kinematic locators on the coordinate measuring machine 100 includes manually controlling the robot 300 to kinematically seat the shaped tip 322 of the reference geometry tool 321 into each of the plurality of CMM kinematic locators, such that the shaped tip 322 is kinematically constrained by each such CMM kinematic locator.

Some embodiments of the method also include, prior to retrieving a first workpiece from the workpiece storage apparatus, configuring the robot 300 into a placement configuration, in which the robot 300 includes a gripper disposed to grip a workpiece; and subsequently include retrieving a first workpiece 180 from the workpiece storage apparatus 200 by controlling the robot 300 to automatically grip the first workpiece with the gripper; and placing the first workpiece 180 onto the coordinate measuring machine 100 within the measuring volume of the coordinate measuring machine by controlling the robot 300 to automatically move the first workpiece 180 from the workpiece storage apparatus 200 to the coordinate measuring machine 100.

Some such embodiments also include, after measuring the first workpiece with the coordinate measuring machine, automatically, using the robot 300, removing the first workpiece from the coordinate measuring machine 100. Such embodiments also include automatically, using the robot 300, retrieving a second workpiece from the workpiece storage apparatus 200, and automatically, using the robot, placing the second workpiece onto the coordinate measuring machine within the measuring volume of the coordinate measuring machine, and then subsequently measuring the second workpiece with the coordinate measuring machine.

Some such embodiments also, include replacing the first workpiece to its original location the workpiece storage apparatus 200. Other embodiments include, as an alternative, placing the first workpiece at a location other than its original location the workpiece storage apparatus 200.

Some embodiments of such methods also include, prior to orienting the robot 300 to the measuring space of the coordinate measuring machine 100, placing onto the coordinate measuring machine 100 a plurality of CMM kinematic locators, each of the plurality of CMM kinematic locator spaced from one another to define the measuring space of the coordinate measuring machine.

Guided Gripper

A known problem for end effectors (e.g., grippers 311) in general is being able to uniformly close over an object such as a workpiece 180, or being able to position itself on that object so that the gripper 311 does not lose grasp on the workpiece 180 during movement. In the past, this has been addressed most often by a human operator by manual moving the arm 302 and gripper 311 into position, or else using manual controls to put the end gripper 311 into position to be able to grasp the workpiece 180. More elaborate methods have been implemented using cameras and computer assisted vision systems which are able to recognize the features of a workpiece 180 and automatically move the robot's gripper 311 into position. Such methods tend to be undesirably costly, however, due to the components and technology being implemented.

Figure 7:
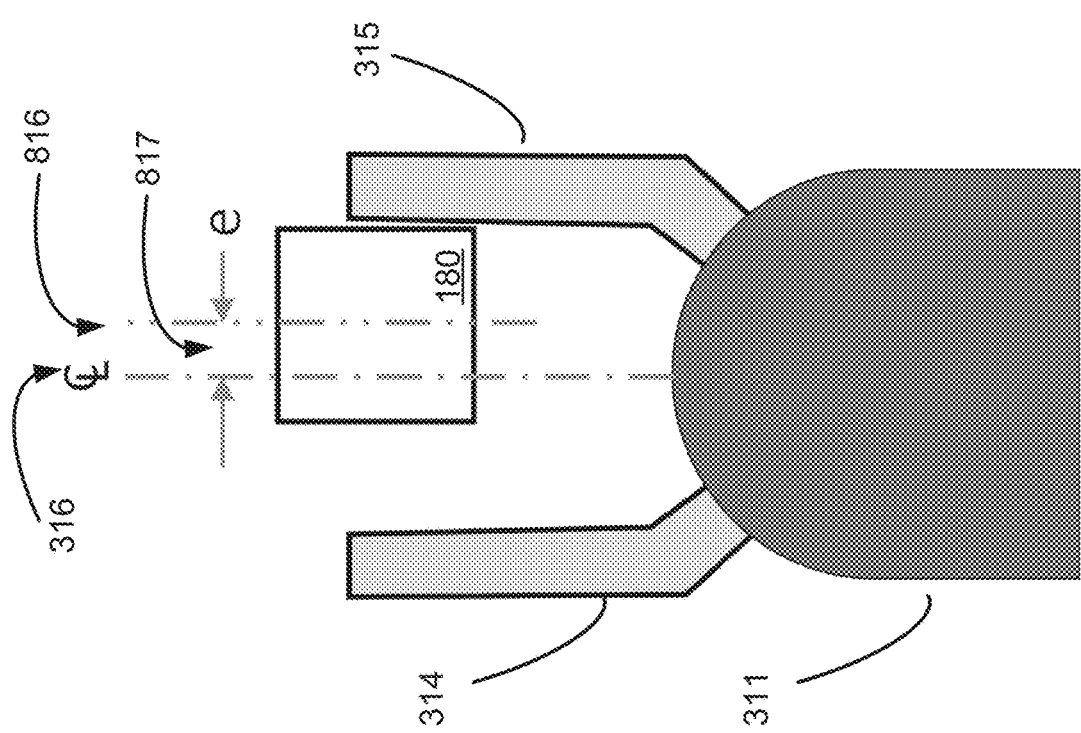
FIG. 7 schematically illustrate an embodiment of an end effector.

FIG. 7 schematically illustrates an undesired location of a two-finger gripper 311 relative to a part (e.g., workpiece 180). As schematically illustrated in FIG. 7, the centerline 316 of the gripping fingers 314, 315 is offset, by offset distance 817, from the centerline 816 (or alignment axis) of the workpiece 180.

Ideally, the centerline 316 of the gripping fingers 314, 315 should be at the centerline 816 (or gripping axis) of the workpiece 180. Tolerances for proper gripping (indicated as "e" for error) can vary greatly but typically range from 1 to 20 mm. Failure to meet the gripping tolerance will result in the gripper 311 being unable to grasp the workpiece 180.

Figure 8:
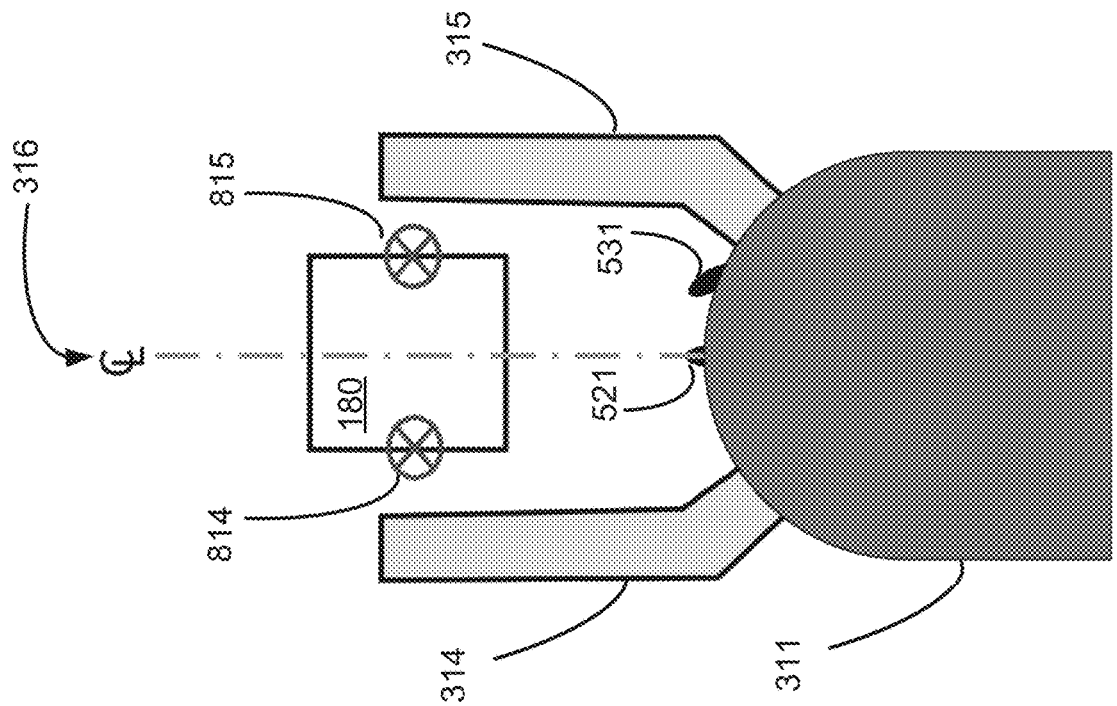
FIG. 8 schematically illustrates an embodiment of an end effector.

In contrast, FIG. 8 schematically illustrates a preferred location of the gripper 311 relative to the workpiece 180, in which the centerline 316 of the gripping fingers 314, 315 is aligned with the alignment axis 816 of the workpiece 180.

Target marks illustrate how a laser target may be used to determine a more accurate center line by way of symmetry between the two recorded target locations Some embodiments provide systems and methods to assist a robot 300 to grasp workpieces 180 using a visual laser target (814, 815) on each workpiece 180. The visual laser target(s) each provide both planer and depth positioning of an end effector (e.g., gripper 311) relative to a workpiece 180.

For example, in some embodiments the gripper 311 has two or more laser diodes 521, 531 at offset angles to one another as described above in connection with the illuminator head 500. The first laser 521 is oriented centrally to the gripper 311 and is parallel to the end effector's preferred approach orientation (in this embodiment, parallel to the centerline 316 of the gripper 311). The second laser 531 is oriented at an angle offset to the first laser 521 so that it's beam 532 intersects the beam 521 of the first laser 521 at a predetermined depth from the gripper 311.

Figure 9:
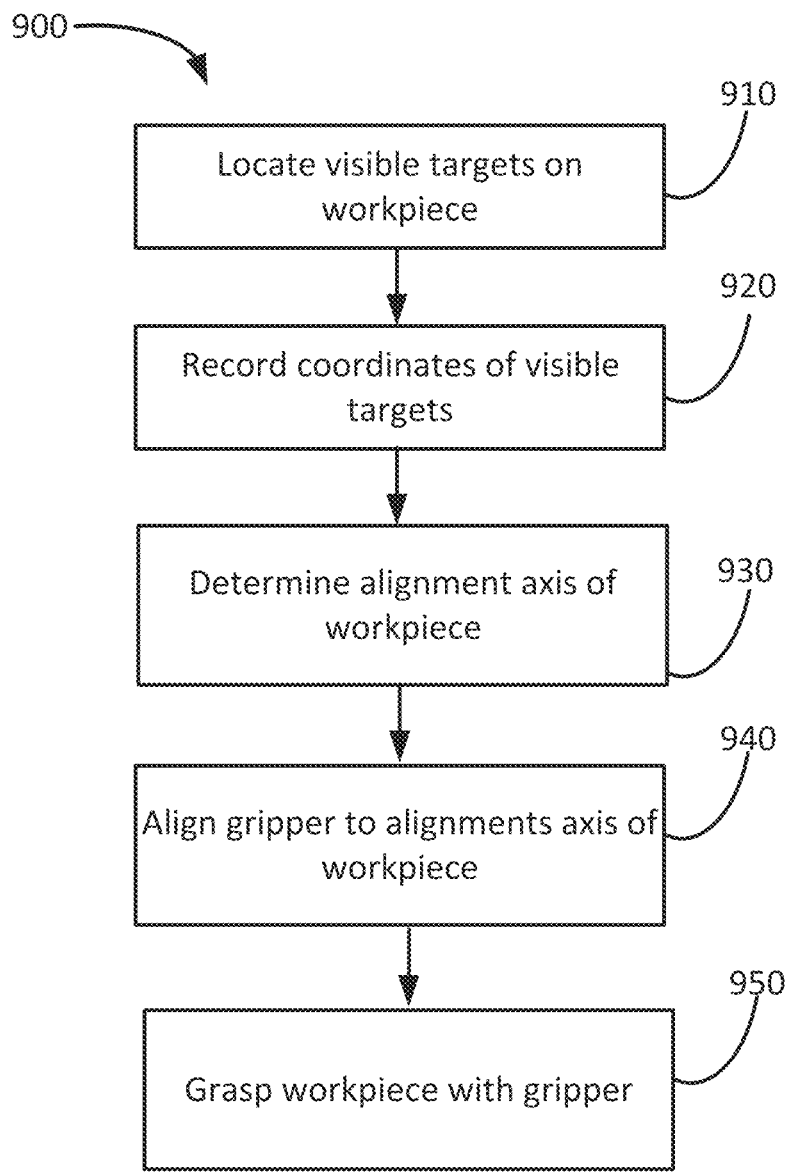
FIG. 9 is a flowchart illustrating an embodiment of orienting an end effector to a workpiece.

Consequently, an embodiment of a method of manipulating a workpiece with an end effector is illustrated in the flow chart of FIG. 9.

The method 900 includes providing a workpiece 180, the workpiece 180 having a surface and a set of visible targets (814; 815) disposed at the surface. Each visible target (814; 815) in the set of visible targets is spaced from each of the other visible targets, so as to geometrically define an alignment axis (or orientation line) 816 of the workpiece 180.

Step 910 of the method includes locating each visible target (814; 815) in the set of visible targets using an illuminator head 500, as described above in connection with FIG. 5H.

Step 920 includes recording the coordinates of each such visible target 814; 815) in a memory.

Step 930 of the method includes determining the orientation line 816 (which may be referred-to as the "alignment axis") based on the geometric locations, respectively, of the visible targets (814; 815). In some embodiments, the orientation line 816 is a centerline of the workpiece. In some embodiments, the orientation line 816 may be defined as a line that passes through each of two visible targets (814; 815). In other embodiments, the orientation line 816 may be defined as a line that intersects, or bisects, a line that passes through each of two visible targets (814; 815).

Step 940 The method also includes, subsequent to determining the orientation line 816, orienting the end effector (gripper 311) to align the centerline 316 of the gripper 311 with the orientation line 816 of the workpiece; and moving the gripper 311 while keeping the centerline 316 of the gripper 311 aligned with the orientation line 816 of the workpiece 180, and then, at step 950, grasping the workpiece 180.

In some embodiments, the illuminator head 500 is integral to the gripper 311 in that the housing of the illuminator head is integral with the gripper 311. In other embodiments, the illuminator head is separate from the gripper 311, and the method further includes (a) prior to locating each visible target 814, 815 in the set of visible targets using an illuminator head, grasping the illuminator head with the gripper 311; and subsequently (b) moving the gripper 311, with the illuminator head 500, to locate each visible target 814, 815 in the set of visible targets; and subsequently (c) discarding the illuminator head 500 from the gripper 311.

A listing of certain reference numbers is presented below.
100: Coordinate measuring machine;
101: Floor;
102: Environment;
110: Base;
111: Table;
112: Plane;
113: Measurement envelope;
115: Probe rack;
120: Moveable features;
121: Bridge legs;
122: Table scale;
123: Bridge;
124: Bridge scale;
125: Carriage;
126: Spindle;
127: Spindle scale;
128: Bearing;
130: Arm;
131: Moveable joint;
132: Rotary encoder;
140: Measuring sensor;
141: Camera;
142: Environmental sensor;
150: Control system;
151: Bus;
152: Communications interface;
153: Motion Controller;
154: Measurement analyzer;
155: Sensor input;

156: Memory;
157: Computer processor;
160: User interface;
161: X-axis controls;
162: Y-axis controls;
163: Z-axis controls;
165: Camera motion controls;
166: Camera focus control;
167: Camera record control;
170: Host computer;
171: Screen;
172: Keyboard;
173: Mouse;
174: Computer memory;
175: Memory interface/communications port;
176: Communication link;
178: Network;
179: Computer;
180: Workpiece;
181: Geometry;
182: Edge;
183: Corner;
184: Flat surface;
185: Curved surface;
186: Cavity;
187: Inside angle;
188: Waviness;
189: Surface finish;
190: Jogbox;
191: Cable;
200: Storage apparatus;
201: Drawer or shelf;
202: Surface of storage plate;
203: Storage plate;
204: Metal button (e.g., magnetic or non-magnetic);
205: Button group;
207: Dowel;
208: Dowel group;
209: Alignment structure (e.g., metal button; dowel);
288: Length of first leg of the triangle;
289: Length of a second leg of the triangle,
300: Robot;
301: Robot base;
302: Robot arm;
303: Distal end of robot arm;
311: Robot gripper;
314: First gripper finger;
315: Second gripper finger;
316: Gripper center line;
317: Gripper gap;
321: Reference geometry tool;
322: Tip of reference geometry tool;
340: Robot end effector (e.g., gripper, etc.)
345: Carousel;
379: Robot control computer;
390: Robot control interface;
400: Pallet;
410: CMM kinematic locator;
411: Concavity;
500: Illuminator head;
510: Housing of illuminator head;
514: First head slot;
515: Second head slot;
521: First light source;
522: First light beam;
523: Second fan beam;
524: First light line;
525: Cross pattern;
528: Crossing point;
529: Intersect spot;
531: Second light source;
532: Second light beam;
534: Second light line;
541: Height;
550: Optical locator;
800: Sighted gripper;
814: First workpiece target;
815: Second workpiece target;
816: Workpiece center line;
817: Gripper-Workpiece offset.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. An illuminator head 500 for use with a robotic arm, the head comprising: a housing 510 comprising a first light emitter 521 and second light emitter 531, wherein: the first light emitter 521 is configured to produce a first beam of light 522, and wherein the second light emitter 531 is configured to produce a second beam of light 532 at an angle 533 relative to the first beam of light 522 such that the first beam of light 522 intersects the second beam of light 523 at a pre-determined distance 541 from the illuminator head 500.

P2. The illuminator head of P1, wherein the first beam of light 522 is a first fan beam of light such that the first beam of light is configured to form a first line when the first beam of light crosses a reference plane, and wherein the second beam of light 533 is a second fan beam of light configured to form a second line when the second beam of light crosses the reference plane, the second line crossing the first line at a non-zero angle in the reference plane (e.g., + or X).

P3: The illuminator head of P2, wherein the first beam of light 522 further comprises a third fan beam of light 523, the third fan beam of light 523 intersecting the first fan beam of light 522 and forming a crossing point 529, wherein the second beam of light is configured to intersect the crossing point 529 at the pre-determined distance.

P21. A method by which a visual laser target is projected from a device held by a robot's end effector (340; 311) which provides planer and/or depth positioning of the end effector relative to an object to be grasped.

P22. The method of P21, wherein the device is comprised of two or more laser diodes whose beams are at offset angles to one another where a first laser has a beam oriented parallel to the end effector's preferred approach orientation and a second laser has a beam oriented at an angle relative to the beam of the first laser so that it's beam intersects the beam of the first laser at a predetermined depth from the end effector.

P23. The method of any of P21-P22, wherein the device has features to be grasped by the end effector (340; 311) so that it may be easily added and removed from the robot arm 302 for teaching or programming pick and place positioning without removing it's end effector.

P24. The method of any of P21-P23, wherein the device has a first laser 521 which has a beam collimated as a line or crosshairs to assist with the planar orientation of an end effector relative to an object to be grasped.

P24. The method of any of P21-P24, wherein the device has a second laser 531 which has a beam collimated as a line or crosshairs to assist with the planar orientation of an end effector relative to an object to be grasped.

P31. A system for manipulating a set of workpieces for measurement by a coordinate measuring machine, the system comprising:
- a robotic arm comprising a reference geometry tool;
- a controller operably coupled to the robotic arm, the controller configurable into an orientation mode to receive location information from the robotic arm when the reference geometry tool is kinematically seated with a kinematic locator.

P32: The system of P31, wherein the controller is further configurable into a placement mode, to automatically operate the robotic arm in a placement configuration to retrieve a workpiece from a storage apparatus and place the workpiece on the coordinate measuring machine.

P41: A method of updating a previously-established orientation of a robot to a workpiece measuring machine, the method comprising: operating the robot to automatically re-locate each kinematic locator on the workpiece measuring machine; recording an updated location of each such re-located kinematic locator (collectively, the updated locations) in the coordinate system of the robot; and updating the orientation of the robot to the workpiece measuring machine based on the updated locations.

P42: A method of updating a previously-established orientation of a robot to a workpiece storage facility, the method comprising: operating the robot to automatically re-locate each kinematic locator on the workpiece storage facility; recording an updated location of each such re-located kinematic locator (collectively, the updated locations) in the coordinate system of the robot; and updating the orientation of the robot to the workpiece storage facility based on the updated locations.

P43: A method of updating a previously-established orientation of a robot to a both workpiece measuring machine and workpiece storage facility, the method comprising: (a) operating the robot to automatically re-locate each kinematic locator on the workpiece storage facility; recording an updated location of each such re-located kinematic locator (collectively, the storage updated locations) in the coordinate system of the robot; and updating the orientation of the robot to the workpiece storage facility based on the storage updated locations; and (b) operating the robot to automatically re-locate each kinematic locator on the workpiece measuring machine; recording an updated location of each such re-located kinematic locator (collectively, the WMM updated locations) in the coordinate system of the robot; and updating the orientation of the robot to the workpiece measuring machine based on the WMM updated locations.

P81: A method of manipulating a workpiece with an end effector, comprising: providing a workpiece, the workpiece having a surface, and a set of visible targets disposed at the surface, each visible target in the set of visible targets spaced from each of the other visible targets, so as to geometrically define an orientation line of the workpiece; locating each visible target in the set of visible targets using an illuminator head; determining the orientation line based on the geometric locations, respectively, of the visible targets; orienting the end effector to align with the centerline; and moving the end effector to grasp the object.

P82: The method of P81, wherein the orientation line is a centerline of the workpiece.

P83: The method of P81 or P82, wherein the illuminator head is separate from the end effector, and the method further comprises: (a) prior to locating each visible target in the set of visible targets using an illuminator head, grasping the illuminator head with the end effector; and subsequently (b) moving the end effector, with the illuminator head, to locate each visible target in the set of visible targets; and subsequently (c) discarding the illuminator head from the end effector.

P84: The method of P81 or P82, wherein the illuminator head is integral to the end effector.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A system including a workpiece measuring machine defining a WMM coordinate system, a workpiece storage apparatus, and a robotic arm having a robotic arm coordinate system that is independent of the WMM coordinate system, the system configured for manipulating a set of workpieces for measurement by the workpiece measuring machine, the system comprising:
the robotic arm configurable into an orientation configuration and a placement configuration, wherein:
in the orientation configuration, the robotic arm deploys a reference geometry tool; and wherein
in the placement configuration, the robotic arm deploys a gripper;
a controller operably coupled to the robotic arm, the controller configured:
to receive, from the robotic arm in the orientation configuration, measuring space coordinates of each of a set of WMM datum markers on the workpiece measuring machine;
to define, based on those measuring space coordinates, a measuring space on the workpiece measuring machine relative to the coordinate system of the robotic arm; and subsequently
to operate the robotic arm in the placement configuration to retrieve sequentially, from a storage space, each workpiece in the set of workpieces, and to place each such workpiece into the measuring space of the workpiece measuring machine.

2. The system of claim 1, wherein the storage apparatus defines a storage coordinate system that is independent of the robotic arm coordinate system, and wherein, in the orientation mode, the controller is further configured to receive, from the robotic arm in the orientation configuration, storage space coordinates of each of a set of storage datum markers on the storage apparatus and to define, based on those storage space coordinates, the storage space.

3. The system of claim 1:
wherein the WMM datum markers are disposed on (i) a WMM or (ii) a pallet; and
wherein each WMM datum marker of the set of set of WMM datum markers comprises a kinematic locator having a kinematic cavity comprising one of (a) a rounded cavity or (b) a conical cavity; and
wherein the reference geometry tool comprises a tip having a tip geometry that fits precisely into the kinematic cavity to become kinematically constrained in only 2.5 dimensions by the kinematic cavity for determining precise coordinate positions with respect to a robot reference system.

4. The system of claim 3, wherein the tip geometry comprises sphere that fits precisely into the kinematic cavity such that the convex surface is kinematically constrained by the kinematic cavity.

5. The system of claim 1, wherein the reference geometry tool comprises a kinematic cavity and each WMM datum marker of the set of WMM datum marker comprises a kinematic locator having a convex surface, the kinematic cavity configured to engage the convex surface of the WMM kinematic locator such that the kinematic cavity is kinematically constrained by the convex surface.

6. The system of claim 1, wherein the reference geometry tool is permanently affixed at a designated position at the end of the robot arm or its end effector.

7. The system of claim 1, wherein the reference geometry tool is removably coupled to a designated position at the end of the robot arm or its end effector.

8. The system of claim 1, wherein the robotic arm simultaneously includes both the gripper and the reference geometry tool, and:
in the orientation configuration, the robotic arm deploys the reference geometry tool at a distal end of the arm; and
in the placement configuration, the gripper the robotic arm deploys the gripper at the distal end of the arm.

9. The system of claim 8, wherein the robotic arm comprises a carousel, and both the gripper and the reference geometry tool are simultaneously disposed on the carousel, and the controller is configured to:
in the orientation configuration, configure the carousel such that the reference geometry tool is disposed at the distal end of the arm; and
in the placement configuration, configure the carousel such that the gripper is disposed at the distal end of the arm.

10. The system of claim 1, wherein the reference geometry tool comprises an illuminator head, the illuminator head comprising:
a first source of visible light configured to project a visible X pattern at a first angle relative to the robotic arm, the X pattern defining a coincident point; and
a second source of visible light configured to project a visible line at a second angle relative to the robotic arm, and wherein:
the second angle is different from the first angle, such that the visible line intersects the coincident point at a known distance from the illuminator head.

11. A computer-implemented method of operating a measurement system having a workpiece measuring machine including a measuring volume, a workpiece storage apparatus, and a workpiece handling robot having a robot coordinate system, the method comprising:
defining a coordinate system common to a measuring space of the workpiece measuring machine, the workpiece storage apparatus, and the workpiece handling robot, defining the coordinate system comprising:
orienting the robot to the measuring space of the workpiece measuring machine, wherein orienting the robot to the measuring space of the workpiece measuring machine comprises, for each WMM datum marker in a set of WMM datum markers on the workpiece measuring machine, locating the WMM datum marker in the robot coordinate system, and recording the location of the WMM datum marker;
orienting the robot to the workpiece storage apparatus, wherein orienting the robot to the workpiece storage apparatus comprises, for each storage datum marker in a set of storage datum markers, locating the storage datum marker in the robot coordinate system, and recording the location of the storage datum marker;
wherein locating each of a plurality of storage datum marker on the workpiece storage apparatus and locating each of a plurality of WMM datum marker on the coordinate measuring machine defines the coordinate system common to a measuring space of the coordinate measuring machine, the workpiece storage apparatus, and the workpiece handling robot, the common coordinate system enabling the robot to accurately retrieve a workpiece from the workpiece storage apparatus and accurately place that workpiece onto a measuring volume of the coordinate measuring machine;

automatically retrieving a first workpiece from the workpiece storage apparatus;

automatically placing the first workpiece onto the measuring volume of the workpiece measuring machine; and automatically measuring the first workpiece with the workpiece measuring machine.

12. The method of claim 11, further comprising, prior to orienting the robot to the workpiece storage apparatus and prior to orienting the robot to the measuring space of the workpiece measuring machine:

configuring the robot into an orientation configuration, in which the robot includes a reference geometry tool; and wherein locating each of a plurality of storage datum markers on the workpiece storage apparatus comprises locating each of the plurality of storage datum marker on the workpiece storage apparatus with the reference geometry tool; and locating each of a plurality of WMM datum markers on the workpiece measuring machine comprises locating each of a plurality of CMM kinematic locators on the workpiece measuring machine with the same reference geometry tool.

13. The method of claim 12, wherein:

each of a plurality of storage datum markers on the workpiece storage apparatus comprises a storage kinematic locator;

each of a plurality of CMM datum markers on the workpiece measuring machine comprises a WMM kinematic locator;

locating each of the plurality of storage kinematic locators on the workpiece storage apparatus comprises manually controlling the robot to seat a shaped tip of the reference geometry tool into each of the plurality of storage kinematic locators such that the shaped tip is kinematically constrained with each such storage kinematic locator; and locating each of the plurality of WMM kinematic locators on the workpiece measuring machine comprises manually controlling the robot to kinematically seat the shaped tip of the reference geometry tool into each of the plurality of WMM kinematic locators, such that the shaped tip is kinematically constrained by each such WMM kinematic locator.

14. The method of claim 11, further comprising, prior to retrieving a first workpiece from the workpiece storage apparatus:

configuring the robot into a placement configuration, in which the robot includes a gripper disposed to grip a workpiece; and wherein after configuring the robot into the placement configuration:

retrieving the first workpiece from the workpiece storage apparatus by controlling the robot to automatically grip the first workpiece with the gripper; and placing the first workpiece onto the workpiece measuring machine within the measuring volume of the workpiece measuring machine by controlling the robot to automatically move the first workpiece from the workpiece storage apparatus to the workpiece measuring machine.

15. The method of claim 14 further comprising, after measuring the first workpiece with the workpiece measuring machine:

automatically, using the robot, removing the first workpiece from the workpiece measuring machine;

automatically, using the robot, retrieving a second workpiece from the workpiece storage apparatus;

automatically, using the robot, placing the second workpiece onto the workpiece measuring machine within the measuring volume of the workpiece measuring machine; and measuring the second workpiece with the workpiece measuring machine.

16. The method of claim 15, wherein removing the first workpiece from the workpiece measuring machine further comprises replacing the first workpiece to its original location the workpiece storage apparatus.

17. The method of claim 15, wherein removing the first workpiece from the workpiece measuring machine further comprises placing the first workpiece to a location other than its original location the workpiece storage apparatus.

18. The method of claim 11, wherein the method further comprises:

prior to orienting the robot to the measuring space of the workpiece measuring machine, placing onto the workpiece measuring machine a plurality of WMM kinematic locators, each of the plurality of WMM kinematic locator spaced from one another the measurement space of the workpiece measuring machine.

19. A system for measuring a set of workpieces, the system comprising:

a workpiece measuring machine;

a workpiece storage apparatus configured to store a set of workpieces; and a workpiece placement robot disposed within reach of both a measuring space of the workpiece measuring machine and the workpiece storage apparatus; and a controller in control communication with the workpiece measuring machine, and the workpiece placement robot, the controller configured to:

respond to operator control to operate the workpiece placement robot to establish a common reference coordinate system among the workpiece measuring machine, the workpiece storage apparatus, and the workpiece placement robot and, after establishing the common reference coordinate system, automatically:

locate a plurality of workpieces at the workpiece storage apparatus, and sequentially, for each of the plurality of workpieces:

operate the placement robot to move the workpiece to the workpiece measuring machine; and operate the workpiece measuring machine to measure the workpiece.

20. The system of claim 19, wherein the controller is further configured to operate the placement robot to automatically return the workpiece to the workpiece storage apparatus.

* * * * *